(12) United States Patent
Bigioi et al.

(10) Patent No.: US 7,962,629 B2
(45) Date of Patent: *Jun. 14, 2011

(54) METHOD FOR ESTABLISHING A PAIRED CONNECTION BETWEEN MEDIA DEVICES

(75) Inventors: Petronel Bigioi, Galway (IE); Peter Corcoran, Galway (IE); Eran Steinberg, San Francisco, CA (US)

(73) Assignee: Tessera Technologies Ireland Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/876,209

(22) Filed: Sep. 6, 2010

(65) Prior Publication Data

US 2011/0060836 A1    Mar. 10, 2011

Related U.S. Application Data

(63) Continuation of application No. 11/294,628, filed on Dec. 2, 2005, now Pat. No. 7,792,970, which is a continuation-in-part of application No. 11/156,234, filed on Jun. 17, 2005, now Pat. No. 7,506,057.

(51) Int. Cl.
*G06F 15/16* (2006.01)
(52) U.S. Cl. ......... 709/227; 709/202; 709/203; 709/228
(58) Field of Classification Search .......... 709/202–203, 709/217–219, 227–229, 250
See application file for complete search history.

(56) References Cited

U.S. PATENT DOCUMENTS

| 4,047,187 A | 9/1977 | Mashimo et al. |
|---|---|---|
| 4,285,588 A | 8/1981 | Mir |
| 4,317,991 A | 3/1982 | Stauffer |
| 4,367,027 A | 1/1983 | Stauffer |
| RE31,370 E | 9/1983 | Mashimo et al. |
| 4,448,510 A | 5/1984 | Murakoshi |
| 4,456,354 A | 6/1984 | Mizokami |
| 4,577,219 A | 3/1986 | Klie et al. |
| 4,638,364 A | 1/1987 | Hiramatsu |

(Continued)

FOREIGN PATENT DOCUMENTS

EP    578508 A2    1/1994

(Continued)

OTHER PUBLICATIONS

Agrawal A. et al., "Removing photography artifacts using gradient projection and flash-exposure sampling" ACM Transactions on Graphics, 2005, pp. 828-835.

(Continued)

*Primary Examiner* — Bharat N Barot
(74) *Attorney, Agent, or Firm* — Andrew V. Smith

(57) ABSTRACT

A method for establishing a paired connection between first and second media devices across a network includes transmitting a first information message across the network including an identifier that includes a request to pair the first and second media devices. When a second information message is received from the second media device within a first predetermined time period, the first device retrieves an identifier of the second device and transmits a confirmation message across the network including the device identifiers. A paired connection between the media devices is completed after a corresponding confirmation message from the second device is received within a second predetermined time period.

32 Claims, 9 Drawing Sheets

U.S. PATENT DOCUMENTS

| | | | |
|---|---|---|---|
| 4,646,134 A | 2/1987 | Komatsu et al. | |
| 4,690,536 A | 9/1987 | Nakai et al. | |
| 4,777,620 A | 10/1988 | Shimoni et al. | |
| 4,796,043 A | 1/1989 | Izumi et al. | |
| 4,881,067 A | 11/1989 | Watanabe et al. | |
| 4,970,663 A | 11/1990 | Bedell et al. | |
| 4,970,683 A | 11/1990 | Harshaw et al. | |
| 4,975,969 A | 12/1990 | Tal | |
| 4,978,989 A | 12/1990 | Nakano et al. | |
| 5,008,946 A | 4/1991 | Ando | |
| 5,016,107 A | 5/1991 | Sasson et al. | |
| 5,018,017 A | 5/1991 | Sasaki et al. | |
| RE33,682 E | 9/1991 | Hiramatsu | |
| 5,051,770 A | 9/1991 | Cornuejols | |
| 5,063,603 A | 11/1991 | Burt | |
| 5,070,355 A | 12/1991 | Inoue et al. | |
| 5,111,231 A | 5/1992 | Tokunaga | |
| 5,130,789 A | 7/1992 | Dobbs et al. | |
| 5,130,935 A | 7/1992 | Takiguchi | |
| 5,150,432 A | 9/1992 | Ueno et al. | |
| 5,161,204 A | 11/1992 | Hutcheson et al. | |
| 5,164,831 A | 11/1992 | Kuchta et al. | |
| 5,164,833 A | 11/1992 | Aoki | |
| 5,164,992 A | 11/1992 | Turk et al. | |
| 5,202,720 A | 4/1993 | Fujino et al. | |
| 5,227,837 A | 7/1993 | Terashita | |
| 5,231,674 A | 7/1993 | Cleveland et al. | |
| 5,249,053 A | 9/1993 | Jain | |
| 5,274,457 A | 12/1993 | Kobayashi et al. | |
| 5,278,923 A | 1/1994 | Nazarathy et al. | |
| 5,280,530 A | 1/1994 | Trew et al. | |
| 5,291,234 A | 3/1994 | Shindo et al. | |
| 5,301,026 A | 4/1994 | Lee | |
| 5,303,049 A | 4/1994 | Ejima et al. | |
| 5,305,048 A | 4/1994 | Suzuki et al. | |
| 5,311,240 A | 5/1994 | Wheeler | |
| 5,331,544 A | 7/1994 | Lu et al. | |
| 5,335,072 A | 8/1994 | Tanaka et al. | |
| 5,353,058 A | 10/1994 | Takei | |
| 5,384,601 A | 1/1995 | Yamashita et al. | |
| 5,384,615 A | 1/1995 | Hsieh et al. | |
| 5,384,912 A | 1/1995 | Ogrinc et al. | |
| 5,400,113 A | 3/1995 | Sosa et al. | |
| 5,424,794 A | 6/1995 | McKay | |
| 5,430,809 A | 7/1995 | Tomitaka | |
| 5,432,863 A | 7/1995 | Benati et al. | |
| 5,432,866 A | 7/1995 | Sakamoto | |
| 5,438,367 A | 8/1995 | Yamamoto et al. | |
| 5,450,504 A | 9/1995 | Calia | |
| 5,452,048 A | 9/1995 | Edgar | |
| 5,455,606 A | 10/1995 | Keeling et al. | |
| 5,465,308 A | 11/1995 | Hutcheson et al. | |
| 5,488,429 A | 1/1996 | Kojima et al. | |
| 5,493,409 A | 2/1996 | Maeda et al. | |
| 5,496,106 A | 3/1996 | Anderson | |
| 5,500,700 A | 3/1996 | Massarsky | |
| 5,537,516 A | 7/1996 | Sherman et al. | |
| 5,543,952 A | 8/1996 | Yonenaga et al. | |
| 5,555,376 A | 9/1996 | Theimer et al. | |
| 5,568,187 A | 10/1996 | Okino | |
| 5,568,194 A | 10/1996 | Abe | |
| 5,576,759 A | 11/1996 | Kawamura et al. | |
| 5,602,997 A | 2/1997 | Carpenter et al. | |
| 5,629,752 A | 5/1997 | Kinjo | |
| 5,633,678 A | 5/1997 | Parulski et al. | |
| 5,638,136 A | 6/1997 | Kojima et al. | |
| 5,638,139 A | 6/1997 | Clatanoff et al. | |
| 5,649,238 A | 7/1997 | Wakabayashi et al. | |
| 5,652,669 A | 7/1997 | Liedenbaum | |
| 5,671,013 A | 9/1997 | Nakao | |
| 5,678,073 A | 10/1997 | Stephenson, III et al. | |
| 5,680,481 A | 10/1997 | Prasad et al. | |
| 5,684,509 A | 11/1997 | Hatanaka et al. | |
| 5,694,926 A | 12/1997 | DeVries et al. | |
| 5,706,362 A | 1/1998 | Yabe | |
| 5,708,866 A | 1/1998 | Leonard | |
| 5,710,833 A | 1/1998 | Moghaddam et al. | |
| 5,715,325 A | 2/1998 | Bang et al. | |
| 5,719,639 A | 2/1998 | Imamura | |
| 5,719,951 A | 2/1998 | Shackleton et al. | |
| 5,721,983 A | 2/1998 | Furutsu | |
| 5,724,456 A | 3/1998 | Boyack et al. | |
| 5,727,135 A | 3/1998 | Webb et al. | |
| 5,734,425 A | 3/1998 | Takizawa et al. | |
| 5,745,668 A | 4/1998 | Poggio et al. | |
| 5,748,764 A | 5/1998 | Benati et al. | |
| 5,748,784 A | 5/1998 | Sugiyama | |
| 5,751,836 A | 5/1998 | Wildes et al. | |
| 5,761,550 A | 6/1998 | Kancigor | |
| 5,764,790 A | 6/1998 | Brunelli et al. | |
| 5,764,803 A | 6/1998 | Jacquin et al. | |
| 5,771,307 A | 6/1998 | Lu et al. | |
| 5,774,129 A | 6/1998 | Poggio et al. | |
| 5,774,172 A | 6/1998 | Kapell et al. | |
| 5,774,591 A | 6/1998 | Black et al. | |
| 5,774,747 A | 6/1998 | Ishihara et al. | |
| 5,774,754 A | 6/1998 | Ootsuka | |
| 5,781,650 A | 7/1998 | Lobo et al. | |
| 5,802,208 A | 9/1998 | Podilchuk et al. | |
| 5,802,220 A | 9/1998 | Black et al. | |
| 5,805,720 A | 9/1998 | Suenaga et al. | |
| 5,805,727 A | 9/1998 | Nakano | |
| 5,805,745 A | 9/1998 | Graf | |
| 5,812,193 A | 9/1998 | Tomitaka et al. | |
| 5,812,865 A | 9/1998 | Theimer et al. | |
| 5,815,749 A | 9/1998 | Tsukahara et al. | |
| 5,818,975 A | 10/1998 | Goodwin et al. | |
| 5,835,616 A | 11/1998 | Lobo et al. | |
| 5,842,194 A | 11/1998 | Arbuckle | |
| 5,844,573 A | 12/1998 | Poggio et al. | |
| 5,847,714 A | 12/1998 | Naqvi et al. | |
| 5,850,470 A | 12/1998 | Kung et al. | |
| 5,852,669 A | 12/1998 | Eleftheriadis et al. | |
| 5,852,823 A | 12/1998 | De Bonet | |
| RE36,041 E | 1/1999 | Turk et al. | |
| 5,862,217 A | 1/1999 | Steinberg et al. | |
| 5,862,218 A | 1/1999 | Steinberg | |
| 5,870,138 A | 2/1999 | Smith et al. | |
| 5,886,732 A | 3/1999 | Humpleman | |
| 5,892,837 A | 4/1999 | Luo et al. | |
| 5,905,521 A | 5/1999 | Gatto et al. | |
| 5,905,807 A | 5/1999 | Kado et al. | |
| 5,911,139 A | 6/1999 | Jain et al. | |
| 5,912,980 A | 6/1999 | Hunke | |
| 5,949,904 A | 9/1999 | Delp | |
| 5,966,549 A | 10/1999 | Hara et al. | |
| 5,974,189 A | 10/1999 | Nicponski | |
| 5,978,519 A | 11/1999 | Bollman et al. | |
| 5,990,973 A | 11/1999 | Sakamoto | |
| 5,991,456 A | 11/1999 | Rahman et al. | |
| 5,991,549 A | 11/1999 | Tsuchida | |
| 5,991,594 A | 11/1999 | Froeber et al. | |
| 5,999,160 A | 12/1999 | Kitamura et al. | |
| 6,006,039 A | 12/1999 | Steinberg et al. | |
| 6,009,209 A | 12/1999 | Acker et al. | |
| 6,011,547 A | 1/2000 | Shiota et al. | |
| 6,016,354 A | 1/2000 | Lin et al. | |
| 6,028,611 A | 2/2000 | Anderson et al. | |
| 6,028,960 A | 2/2000 | Graf et al. | |
| 6,035,072 A | 3/2000 | Read | |
| 6,035,074 A | 3/2000 | Fujimoto et al. | |
| 6,036,072 A | 3/2000 | Lee | |
| 6,053,268 A | 4/2000 | Yamada | |
| 6,061,055 A | 5/2000 | Marks | |
| 6,072,094 A | 6/2000 | Karady et al. | |
| 6,097,470 A | 8/2000 | Buhr et al. | |
| 6,101,271 A | 8/2000 | Yamashita et al. | |
| 6,104,839 A | 8/2000 | Cok et al. | |
| 6,108,437 A | 8/2000 | Lin | |
| 6,115,052 A | 9/2000 | Freeman et al. | |
| 6,118,485 A | 9/2000 | Hinoue et al. | |
| 6,128,397 A | 10/2000 | Baluja et al. | |
| 6,128,398 A | 10/2000 | Kuperstein et al. | |
| 6,134,339 A | 10/2000 | Luo | |
| 6,148,092 A | 11/2000 | Qian | |
| 6,151,073 A | 11/2000 | Steinberg et al. | |
| 6,151,403 A | 11/2000 | Luo | |

| | | |
|---|---|---|
| 6,172,706 B1 | 1/2001 | Tatsumi |
| 6,173,068 B1 | 1/2001 | Prokoski |
| 6,181,805 B1 | 1/2001 | Koike et al. |
| 6,182,094 B1 | 1/2001 | Humpleman et al. |
| 6,184,998 B1 | 2/2001 | Tebeka |
| 6,188,777 B1 | 2/2001 | Darrell et al. |
| 6,192,149 B1 | 2/2001 | Eschbach et al. |
| 6,195,127 B1 | 2/2001 | Sugimoto |
| 6,201,571 B1 | 3/2001 | Ota |
| 6,204,858 B1 | 3/2001 | Gupta |
| 6,204,868 B1 | 3/2001 | Yamauchi et al. |
| 6,211,870 B1 | 4/2001 | Foster |
| 6,233,364 B1 | 5/2001 | Krainiouk et al. |
| 6,240,198 B1 | 5/2001 | Rehg et al. |
| 6,246,779 B1 | 6/2001 | Fukui et al. |
| 6,246,790 B1 | 6/2001 | Huang et al. |
| 6,249,315 B1 | 6/2001 | Holm |
| 6,252,976 B1 | 6/2001 | Schildkraut et al. |
| 6,263,113 B1 | 7/2001 | Abdel-Mottaleb et al. |
| 6,266,054 B1 | 7/2001 | Lawton et al. |
| 6,268,939 B1 | 7/2001 | Klassen et al. |
| 6,275,144 B1 | 8/2001 | Rumbaugh |
| 6,275,614 B1 | 8/2001 | Krishnamurthy et al. |
| 6,278,491 B1 | 8/2001 | Wang et al. |
| 6,282,317 B1 | 8/2001 | Luo et al. |
| 6,285,410 B1 | 9/2001 | Marni |
| 6,292,574 B1 | 9/2001 | Schildkraut et al. |
| 6,292,575 B1 | 9/2001 | Bortolussi et al. |
| 6,295,378 B1 | 9/2001 | Kitakado et al. |
| 6,298,166 B1 | 10/2001 | Ratnakar et al. |
| 6,300,935 B1 | 10/2001 | Sobel et al. |
| 6,301,370 B1 | 10/2001 | Steffens et al. |
| 6,301,440 B1 | 10/2001 | Bolle et al. |
| 6,332,033 B1 | 12/2001 | Qian |
| 6,334,008 B2 | 12/2001 | Nakabayashi |
| 6,349,373 B2 | 2/2002 | Sitka et al. |
| 6,351,556 B1 | 2/2002 | Loui et al. |
| 6,381,345 B1 | 4/2002 | Swain |
| 6,393,136 B1 | 5/2002 | Amir et al. |
| 6,393,148 B1 | 5/2002 | Bhaskar |
| 6,396,963 B2 | 5/2002 | Shaffer et al. |
| 6,400,830 B1 | 6/2002 | Christian et al. |
| 6,404,900 B1 | 6/2002 | Qian et al. |
| 6,407,777 B1 | 6/2002 | DeLuca |
| 6,421,468 B1 | 7/2002 | Ratnakar et al. |
| 6,426,775 B1 | 7/2002 | Kurokawa |
| 6,426,779 B1 | 7/2002 | Noguchi et al. |
| 6,429,924 B1 | 8/2002 | Milch |
| 6,433,818 B1 | 8/2002 | Steinberg et al. |
| 6,438,234 B1 | 8/2002 | Gisin et al. |
| 6,438,264 B1 | 8/2002 | Gallagher et al. |
| 6,441,854 B2 | 8/2002 | Fellegara et al. |
| 6,445,810 B2 | 9/2002 | Darrell et al. |
| 6,456,339 B1 | 9/2002 | Surati et al. |
| 6,456,732 B1 | 9/2002 | Kimbell et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,496,122 B2 | 12/2002 | Sampsell |
| 6,496,655 B1 | 12/2002 | Malloy Desormeaux |
| 6,501,857 B1 | 12/2002 | Gotsman et al. |
| 6,501,911 B1 | 12/2002 | Malloy Desormeaux |
| 6,502,107 B1 | 12/2002 | Nishida |
| 6,504,546 B1 | 1/2003 | Cosatto et al. |
| 6,504,942 B1 | 1/2003 | Hong et al. |
| 6,504,951 B1 | 1/2003 | Luo et al. |
| 6,505,003 B1 | 1/2003 | Malloy Desormeaux |
| 6,510,520 B1 | 1/2003 | Steinberg |
| 6,516,154 B1 | 2/2003 | Parulski et al. |
| 6,526,156 B1 | 2/2003 | Black et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,591,069 B2 | 7/2003 | Horiguchi |
| 6,606,398 B2 | 8/2003 | Cooper |
| 6,614,471 B1 | 9/2003 | Ott |
| 6,614,995 B2 | 9/2003 | Tseng |
| 6,621,867 B1 | 9/2003 | Sazzad et al. |
| 6,628,833 B1 | 9/2003 | Horie |
| 6,633,281 B2 | 10/2003 | Lin et al. |
| 6,633,655 B1 | 10/2003 | Hong et al. |
| 6,661,907 B2 | 12/2003 | Ho et al. |
| 6,678,407 B1 | 1/2004 | Tajima |
| 6,690,357 B1 | 2/2004 | Dunton et al. |
| 6,697,090 B1 | 2/2004 | Nagasaka et al. |
| 6,697,503 B2 | 2/2004 | Matsuo et al. |
| 6,697,504 B2 | 2/2004 | Tsai |
| 6,700,614 B1 | 3/2004 | Hata |
| 6,700,999 B1 | 3/2004 | Yang |
| 6,707,950 B1 | 3/2004 | Burns et al. |
| 6,714,665 B1 | 3/2004 | Hanna et al. |
| 6,718,051 B1 | 4/2004 | Eschbach |
| 6,724,941 B1 | 4/2004 | Aoyama |
| 6,725,281 B1 | 4/2004 | Zintel et al. |
| 6,728,401 B1 | 4/2004 | Hardeberg |
| 6,747,690 B2 | 6/2004 | Molgaard |
| 6,750,902 B1 | 6/2004 | Steinberg et al. |
| 6,754,368 B1 | 6/2004 | Cohen |
| 6,754,389 B1 | 6/2004 | Dimitrova et al. |
| 6,760,465 B2 | 7/2004 | McVeigh et al. |
| 6,760,485 B1 | 7/2004 | Gilman et al. |
| 6,765,612 B1 | 7/2004 | Anderson et al. |
| 6,765,686 B2 | 7/2004 | Maruoka |
| 6,778,216 B1 | 8/2004 | Lin |
| 6,779,004 B1 | 8/2004 | Zintel |
| 6,786,655 B2 | 9/2004 | Cook et al. |
| 6,792,135 B1 | 9/2004 | Toyama |
| 6,792,161 B1 | 9/2004 | Imaizumi et al. |
| 6,798,459 B2 | 9/2004 | Izumi |
| 6,798,834 B1 | 9/2004 | Murakami et al. |
| 6,798,913 B2 | 9/2004 | Toriyama |
| 6,801,250 B1 | 10/2004 | Miyashita |
| 6,801,642 B2 | 10/2004 | Gorday et al. |
| 6,810,409 B1 | 10/2004 | Fry et al. |
| 6,816,156 B2 | 11/2004 | Sukeno et al. |
| 6,816,611 B1 | 11/2004 | Hagiwara et al. |
| 6,822,698 B2 | 11/2004 | Clapper |
| 6,829,009 B2 | 12/2004 | Sugimoto |
| 6,850,274 B1 | 2/2005 | Silverbrook et al. |
| 6,859,565 B2 | 2/2005 | Baron |
| 6,873,743 B2 | 3/2005 | Steinberg |
| 6,876,755 B1 | 4/2005 | Taylor et al. |
| 6,879,705 B1 | 4/2005 | Tao et al. |
| 6,885,760 B2 | 4/2005 | Yamada et al. |
| 6,885,766 B2 | 4/2005 | Held et al. |
| 6,894,686 B2 | 5/2005 | Stamper et al. |
| 6,895,112 B2 | 5/2005 | Chen et al. |
| 6,900,840 B1 | 5/2005 | Schinner et al. |
| 6,900,882 B2 | 5/2005 | Iida |
| 6,912,298 B1 | 6/2005 | Wilensky |
| 6,934,406 B1 | 8/2005 | Nakano |
| 6,937,773 B1 | 8/2005 | Nozawa et al. |
| 6,937,997 B1 | 8/2005 | Parulski |
| 6,940,545 B1 | 9/2005 | Ray et al. |
| 6,947,601 B2 | 9/2005 | Aoki et al. |
| 6,959,109 B2 | 10/2005 | Moustafa |
| 6,965,684 B2 | 11/2005 | Chen et al. |
| 6,967,680 B1 | 11/2005 | Kagle et al. |
| 6,977,687 B1 | 12/2005 | Suh |
| 6,980,691 B2 | 12/2005 | Nesterov et al. |
| 6,984,039 B2 | 1/2006 | Agostinelli |
| 6,993,157 B1 | 1/2006 | Oue et al. |
| 7,003,135 B2 | 2/2006 | Hsieh et al. |
| 7,020,337 B2 | 3/2006 | Viola et al. |
| 7,023,498 B2 | 4/2006 | Ishihara |
| 7,024,051 B2 | 4/2006 | Miller et al. |
| 7,024,053 B2 | 4/2006 | Enomoto |
| 7,027,619 B2 | 4/2006 | Pavlidis et al. |
| 7,027,621 B1 | 4/2006 | Prokoski |
| 7,027,662 B2 | 4/2006 | Baron |
| 7,030,927 B2 | 4/2006 | Sasaki |
| 7,034,848 B2 | 4/2006 | Sobol |
| 7,035,456 B2 | 4/2006 | Lestideau |
| 7,035,461 B2 | 4/2006 | Luo et al. |

| | | | | | | |
|---|---|---|---|---|---|---|
| 7,035,462 B2 | 4/2006 | White et al. | 7,460,694 B2 | 12/2008 | Corcoran et al. | |
| 7,035,467 B2 | 4/2006 | Nicponski | 7,460,695 B2 | 12/2008 | Steinberg et al. | |
| 7,038,709 B1 | 5/2006 | Verghese | 7,466,866 B2 | 12/2008 | Steinberg | |
| 7,038,715 B1 | 5/2006 | Flinchbaugh | 7,469,055 B2 | 12/2008 | Corcoran et al. | |
| 7,039,222 B2 | 5/2006 | Simon et al. | 7,469,071 B2 | 12/2008 | Drimbarean et al. | |
| 7,039,727 B2 | 5/2006 | Camara et al. | 7,471,846 B2 | 12/2008 | Steinberg et al. | |
| 7,042,501 B2 | 5/2006 | Matama | 7,496,278 B2 | 2/2009 | Miyamoto et al. | |
| 7,042,505 B1 | 5/2006 | DeLuca | 7,502,494 B2 | 3/2009 | Tafuku et al. | |
| 7,042,511 B2 | 5/2006 | Lin | 7,506,057 B2 * | 3/2009 | Bigioi et al. | 709/227 |
| 7,043,056 B2 | 5/2006 | Edwards et al. | 7,515,740 B2 | 4/2009 | Corcoran et al. | |
| 7,043,465 B2 | 5/2006 | Pirim | 7,519,686 B2 | 4/2009 | Hong et al. | |
| 7,050,607 B2 | 5/2006 | Li et al. | 7,536,036 B2 | 5/2009 | Steinberg et al. | |
| 7,057,653 B1 | 6/2006 | Kubo | 7,551,211 B2 | 6/2009 | Taguchi et al. | |
| 7,061,648 B2 | 6/2006 | Nakajima et al. | 7,564,994 B1 | 7/2009 | Steinberg et al. | |
| 7,062,086 B2 | 6/2006 | Chen et al. | 7,565,030 B2 | 7/2009 | Steinberg et al. | |
| 7,064,776 B2 | 6/2006 | Sumi et al. | 7,574,016 B2 | 8/2009 | Steinberg et al. | |
| 7,082,212 B2 | 7/2006 | Liu et al. | 7,581,182 B1 | 8/2009 | Herz | |
| 7,088,386 B2 | 8/2006 | Goto | 7,612,794 B2 | 11/2009 | He et al. | |
| 7,092,022 B1 | 8/2006 | Brake | 7,616,233 B2 | 11/2009 | Steinberg et al. | |
| 7,099,510 B2 | 8/2006 | Jones et al. | 7,620,214 B2 | 11/2009 | Chen et al. | |
| 7,106,374 B1 | 9/2006 | Bandera et al. | 7,623,733 B2 | 11/2009 | Hirosawa | |
| 7,106,887 B2 | 9/2006 | Kinjo | 7,630,527 B2 | 12/2009 | Steinberg et al. | |
| 7,110,569 B2 | 9/2006 | Brodsky et al. | 7,634,109 B2 | 12/2009 | Steinberg et al. | |
| 7,110,575 B2 | 9/2006 | Chen et al. | 7,636,485 B2 | 12/2009 | Simon et al. | |
| 7,113,641 B1 | 9/2006 | Eckes et al. | 7,652,693 B2 | 1/2010 | Miyashita et al. | |
| 7,115,032 B2 | 10/2006 | Cantu et al. | 7,683,946 B2 | 3/2010 | Steinberg et al. | |
| 7,116,820 B2 | 10/2006 | Luo et al. | 7,684,630 B2 | 3/2010 | Steinberg | |
| 7,119,838 B2 | 10/2006 | Zanzucchi et al. | 7,685,341 B2 | 3/2010 | Steinberg et al. | |
| 7,120,279 B2 | 10/2006 | Chen et al. | 7,692,696 B2 | 4/2010 | Steinberg et al. | |
| 7,128,420 B2 | 10/2006 | Kapellner et al. | 7,693,311 B2 | 4/2010 | Steinberg et al. | |
| 7,133,070 B2 | 11/2006 | Wheeler et al. | 7,694,048 B2 | 4/2010 | Steinberg et al. | |
| 7,146,026 B2 | 12/2006 | Russon et al. | 7,702,136 B2 | 4/2010 | Steinberg et al. | |
| 7,151,843 B2 | 12/2006 | Rui et al. | 7,733,388 B2 | 6/2010 | Asaeda | |
| 7,155,058 B2 | 12/2006 | Gaubatz et al. | 7,738,015 B2 | 6/2010 | Steinberg et al. | |
| 7,158,680 B2 | 1/2007 | Pace | 7,747,596 B2 | 6/2010 | Bigioi et al. | |
| 7,162,076 B2 | 1/2007 | Liu | 7,792,920 B2 * | 9/2010 | Istvan et al. | 709/203 |
| 7,162,101 B2 | 1/2007 | Itokawa et al. | 7,792,970 B2 * | 9/2010 | Bigioi et al. | 709/227 |
| 7,171,023 B2 | 1/2007 | Kim et al. | 7,809,162 B2 | 10/2010 | Steinberg et al. | |
| 7,171,025 B2 | 1/2007 | Rui et al. | 2001/0005222 A1 | 6/2001 | Yamaguchi | |
| 7,171,044 B2 | 1/2007 | Chen et al. | 2001/0015760 A1 | 8/2001 | Fellegara et al. | |
| 7,190,829 B2 | 3/2007 | Zhang et al. | 2001/0028731 A1 | 10/2001 | Covell et al. | |
| 7,194,114 B2 | 3/2007 | Schneiderman | 2001/0031142 A1 | 10/2001 | Whiteside | |
| 7,199,909 B2 | 4/2007 | Han et al. | 2001/0038712 A1 | 11/2001 | Loce et al. | |
| 7,200,249 B2 | 4/2007 | Okubo et al. | 2001/0038714 A1 | 11/2001 | Masumoto et al. | |
| 7,202,893 B2 | 4/2007 | Schick et al. | 2001/0052937 A1 | 12/2001 | Suzuki | |
| 7,216,289 B2 | 5/2007 | Kagle et al. | 2002/0019859 A1 | 2/2002 | Watanabe | |
| 7,218,759 B1 | 5/2007 | Ho et al. | 2002/0038372 A1 | 3/2002 | Idehara et al. | |
| 7,224,850 B2 | 5/2007 | Zhang et al. | 2002/0041329 A1 | 4/2002 | Steinberg | |
| 7,227,976 B1 | 6/2007 | Jung et al. | 2002/0043557 A1 | 4/2002 | Mizoguchi et al. | |
| 7,254,257 B2 | 8/2007 | Kim et al. | 2002/0051571 A1 | 5/2002 | Jackway et al. | |
| 7,269,292 B2 | 9/2007 | Steinberg | 2002/0054224 A1 | 5/2002 | Wasula et al. | |
| 7,274,822 B2 | 9/2007 | Zhang et al. | 2002/0081003 A1 | 6/2002 | Sobol | |
| 7,274,832 B2 | 9/2007 | Nicponski | 2002/0084909 A1 | 7/2002 | Stefanik et al. | |
| 7,289,664 B2 | 10/2007 | Enomoto | 2002/0085088 A1 | 7/2002 | Eubanks | |
| 7,295,233 B2 | 11/2007 | Steinberg et al. | 2002/0090133 A1 | 7/2002 | Kim et al. | |
| 7,310,443 B1 | 12/2007 | Kris et al. | 2002/0093577 A1 | 7/2002 | Kitawaki et al. | |
| 7,315,630 B2 | 1/2008 | Steinberg et al. | 2002/0093633 A1 | 7/2002 | Milch | |
| 7,315,631 B1 | 1/2008 | Corcoran et al. | 2002/0102024 A1 | 8/2002 | Jones et al. | |
| 7,317,815 B2 | 1/2008 | Steinberg et al. | 2002/0105662 A1 | 8/2002 | Patton et al. | |
| 7,321,391 B2 | 1/2008 | Ishige | 2002/0106114 A1 | 8/2002 | Yan et al. | |
| 7,321,670 B2 | 1/2008 | Yoon et al. | 2002/0114513 A1 | 8/2002 | Hirao | |
| 7,324,670 B2 | 1/2008 | Kozakaya et al. | 2002/0114535 A1 | 8/2002 | Luo | |
| 7,324,671 B2 | 1/2008 | Li et al. | 2002/0118287 A1 | 8/2002 | Grosvenor et al. | |
| 7,336,821 B2 | 2/2008 | Ciuc et al. | 2002/0120944 A1 | 8/2002 | Wasilewski | |
| 7,336,830 B2 | 2/2008 | Porter et al. | 2002/0126893 A1 | 9/2002 | Held et al. | |
| 7,340,214 B1 | 3/2008 | Hamberg | 2002/0131770 A1 | 9/2002 | Meier et al. | |
| 7,352,393 B2 | 4/2008 | Sakamoto | 2002/0136433 A1 | 9/2002 | Lin | |
| 7,352,394 B1 | 4/2008 | DeLuca et al. | 2002/0136450 A1 | 9/2002 | Chen et al. | |
| 7,362,210 B2 | 4/2008 | Bazakos et al. | 2002/0141640 A1 | 10/2002 | Kraft | |
| 7,362,368 B2 | 4/2008 | Steinberg et al. | 2002/0141661 A1 | 10/2002 | Steinberg | |
| 7,369,712 B2 | 5/2008 | Steinberg et al. | 2002/0150291 A1 | 10/2002 | Naf et al. | |
| 7,380,260 B1 | 5/2008 | Billmaier et al. | 2002/0150292 A1 | 10/2002 | O'callaghan | |
| 7,403,643 B2 | 7/2008 | Ianculescu et al. | 2002/0150306 A1 | 10/2002 | Baron | |
| 7,432,990 B2 | 10/2008 | Borden, IV et al. | 2002/0150662 A1 | 10/2002 | Dewis et al. | |
| 7,436,998 B2 | 10/2008 | Steinberg et al. | 2002/0159630 A1 | 10/2002 | Buzuloiu et al. | |
| 7,437,998 B2 | 10/2008 | Burger et al. | 2002/0168108 A1 | 11/2002 | Loui et al. | |
| 7,440,593 B1 | 10/2008 | Steinberg et al. | 2002/0172419 A1 | 11/2002 | Lin et al. | |
| 7,454,040 B2 | 11/2008 | Luo et al. | 2002/0176609 A1 | 11/2002 | Hsieh et al. | |
| 7,457,966 B2 | 11/2008 | Shinada | 2002/0176623 A1 | 11/2002 | Steinberg | |

| | | | | | |
|---|---|---|---|---|---|
| 2002/0181801 A1 | 12/2002 | Needham et al. | 2004/0146057 A1 | 7/2004 | Yi et al. |
| 2002/0191861 A1 | 12/2002 | Cheatle | 2004/0150743 A1 | 8/2004 | Schinner |
| 2003/0007687 A1 | 1/2003 | Nesterov et al. | 2004/0155791 A1 | 8/2004 | Nguyen et al. |
| 2003/0012414 A1 | 1/2003 | Luo | 2004/0160517 A1 | 8/2004 | Iida |
| 2003/0021478 A1 | 1/2003 | Yoshida | 2004/0165215 A1 | 8/2004 | Raguet et al. |
| 2003/0023974 A1 | 1/2003 | Dagtas et al. | 2004/0170397 A1 | 9/2004 | Ono |
| 2003/0025808 A1 | 2/2003 | Parulski et al. | 2004/0175021 A1 | 9/2004 | Porter et al. |
| 2003/0025811 A1 | 2/2003 | Keelan et al. | 2004/0175040 A1 | 9/2004 | Rizzotti et al. |
| 2003/0025812 A1 | 2/2003 | Slatter | 2004/0179719 A1 | 9/2004 | Chen et al. |
| 2003/0035573 A1 | 2/2003 | Duta et al. | 2004/0184044 A1 | 9/2004 | Kolb et al. |
| 2003/0044063 A1 | 3/2003 | Meckes et al. | 2004/0184670 A1 | 9/2004 | Jarman et al. |
| 2003/0044070 A1 | 3/2003 | Fuersich et al. | 2004/0196292 A1 | 10/2004 | Okamura |
| 2003/0044176 A1 | 3/2003 | Saitoh | 2004/0196503 A1 | 10/2004 | Kurtenbach et al. |
| 2003/0044177 A1 | 3/2003 | Oberhardt et al. | 2004/0205220 A1 | 10/2004 | Nakamura et al. |
| 2003/0044178 A1 | 3/2003 | Oberhardt et al. | 2004/0213476 A1 | 10/2004 | Luo et al. |
| 2003/0048950 A1 | 3/2003 | Savakis et al. | 2004/0218832 A1 | 11/2004 | Luo et al |
| 2003/0052991 A1 | 3/2003 | Stavely et al. | 2004/0221044 A1 | 11/2004 | Rosenbloom et al. |
| 2003/0058343 A1 | 3/2003 | Katayama | 2004/0223060 A1 | 11/2004 | Yasuda |
| 2003/0058349 A1 | 3/2003 | Takemoto | 2004/0223063 A1 | 11/2004 | DeLuca et al. |
| 2003/0059107 A1 | 3/2003 | Sun et al. | 2004/0223649 A1 | 11/2004 | Zacks et al. |
| 2003/0059121 A1 | 3/2003 | Savakis et al. | 2004/0223747 A1 | 11/2004 | Otala et al. |
| 2003/0068083 A1 | 4/2003 | Lee | 2004/0224638 A1 | 11/2004 | Fadell et al. |
| 2003/0071908 A1 | 4/2003 | Sannoh et al. | 2004/0227978 A1 | 11/2004 | Enomoto |
| 2003/0084065 A1 | 5/2003 | Lin et al. | 2004/0228505 A1 | 11/2004 | Sugimoto |
| 2003/0086134 A1 | 5/2003 | Enomoto | 2004/0228542 A1 | 11/2004 | Zhang et al. |
| 2003/0095197 A1 | 5/2003 | Wheeler et al. | 2004/0233299 A1 | 11/2004 | Ioffe et al. |
| 2003/0107649 A1 | 6/2003 | Flickner et al. | 2004/0233301 A1 | 11/2004 | Nakata et al. |
| 2003/0113035 A1 | 6/2003 | Cahill et al. | 2004/0234156 A1 | 11/2004 | Watanabe et al. |
| 2003/0117501 A1 | 6/2003 | Shirakawa | 2004/0239779 A1 | 12/2004 | Washisu |
| 2003/0118216 A1 | 6/2003 | Goldberg | 2004/0240747 A1 | 12/2004 | Jarman et al. |
| 2003/0123713 A1 | 7/2003 | Geng | 2004/0258308 A1 | 12/2004 | Sadovsky et al. |
| 2003/0123751 A1 | 7/2003 | Krishnamurthy et al. | 2004/0264744 A1 | 12/2004 | Zhang et al. |
| 2003/0137597 A1 | 7/2003 | Sakamoto et al. | 2005/0001024 A1 | 1/2005 | Kusaka et al. |
| 2003/0142209 A1 | 7/2003 | Yamazaki et al. | 2005/0013479 A1 | 1/2005 | Xiao et al. |
| 2003/0142285 A1 | 7/2003 | Enomoto | 2005/0013602 A1 | 1/2005 | Ogawa |
| 2003/0151674 A1 | 8/2003 | Lin | 2005/0013603 A1 | 1/2005 | Ichimasa |
| 2003/0160890 A1 | 8/2003 | Caspe et al. | 2005/0018923 A1 | 1/2005 | Messina et al. |
| 2003/0161506 A1 | 8/2003 | Velazquez et al. | 2005/0024498 A1 | 2/2005 | Iida et al. |
| 2003/0163542 A1 | 8/2003 | Bulthuis et al. | 2005/0024606 A1 | 2/2005 | Li et al. |
| 2003/0169907 A1 | 9/2003 | Edwards et al. | 2005/0031224 A1 | 2/2005 | Prilutsky et al. |
| 2003/0174773 A1 | 9/2003 | Comaniciu et al. | 2005/0036044 A1 | 2/2005 | Funakura |
| 2003/0190072 A1 | 10/2003 | Adkins et al. | 2005/0041121 A1 | 2/2005 | Steinberg et al. |
| 2003/0194143 A1 | 10/2003 | Iida | 2005/0046730 A1 | 3/2005 | Li |
| 2003/0202715 A1 | 10/2003 | Kinjo | 2005/0047655 A1 | 3/2005 | Luo et al. |
| 2003/0223622 A1 | 12/2003 | Simon et al. | 2005/0047656 A1 | 3/2005 | Luo et al. |
| 2004/0001616 A1 | 1/2004 | Gutta et al. | 2005/0053279 A1 | 3/2005 | Chen et al. |
| 2004/0017481 A1 | 1/2004 | Takasumi et al. | 2005/0055716 A1 | 3/2005 | Louie et al. |
| 2004/0022435 A1 | 2/2004 | Ishida | 2005/0058340 A1 | 3/2005 | Chen et al. |
| 2004/0027593 A1 | 2/2004 | Wilkins | 2005/0058342 A1 | 3/2005 | Chen et al. |
| 2004/0032512 A1 | 2/2004 | Silverbrook | 2005/0062856 A1 | 3/2005 | Matsushita |
| 2004/0032526 A1 | 2/2004 | Silverbrook | 2005/0063083 A1 | 3/2005 | Dart et al. |
| 2004/0033071 A1 | 2/2004 | Kubo | 2005/0068446 A1 | 3/2005 | Steinberg et al. |
| 2004/0037460 A1 | 2/2004 | Luo et al. | 2005/0068447 A1 | 3/2005 | Steinberg et al. |
| 2004/0041121 A1 | 3/2004 | Yoshida et al. | 2005/0068452 A1 | 3/2005 | Steinberg et al. |
| 2004/0041924 A1 | 3/2004 | White et al. | 2005/0069208 A1 | 3/2005 | Morisada |
| 2004/0046878 A1 | 3/2004 | Jarman | 2005/0074164 A1 | 4/2005 | Yonaha |
| 2004/0047491 A1 | 3/2004 | Rydbeck | 2005/0074179 A1 | 4/2005 | Wilensky |
| 2004/0056975 A1 | 3/2004 | Hata | 2005/0078191 A1 | 4/2005 | Battles |
| 2004/0057623 A1 | 3/2004 | Schuhrke et al. | 2005/0089218 A1 | 4/2005 | Chiba |
| 2004/0057705 A1 | 3/2004 | Kohno | 2005/0104848 A1 | 5/2005 | Yamaguchi et al. |
| 2004/0057715 A1 | 3/2004 | Tsuchida et al. | 2005/0105780 A1 | 5/2005 | Ioffe |
| 2004/0070694 A1 | 4/2004 | Haruna et al. | 2005/0117132 A1 | 6/2005 | Agostinelli |
| 2004/0090461 A1 | 5/2004 | Adams | 2005/0128518 A1 | 6/2005 | Tsue et al. |
| 2004/0093432 A1 | 5/2004 | Luo et al. | 2005/0129278 A1 | 6/2005 | Rui et al. |
| 2004/0095359 A1 | 5/2004 | Simon et al. | 2005/0129331 A1 | 6/2005 | Kakiuchi et al. |
| 2004/0100486 A1 | 5/2004 | Flamini et al. | 2005/0134719 A1 | 6/2005 | Beck |
| 2004/0114796 A1 | 6/2004 | Kaku | 2005/0140801 A1 | 6/2005 | Prilutsky et al. |
| 2004/0114797 A1 | 6/2004 | Meckes | 2005/0147278 A1 | 7/2005 | Rui et al. |
| 2004/0114829 A1 | 6/2004 | LeFeuvre et al. | 2005/0151943 A1 | 7/2005 | Iida |
| 2004/0114904 A1 | 6/2004 | Sun et al. | 2005/0163498 A1 | 7/2005 | Battles et al. |
| 2004/0119851 A1 | 6/2004 | Kaku | 2005/0168965 A1 | 8/2005 | Yoshida |
| 2004/0120391 A1 | 6/2004 | Lin et al. | 2005/0185054 A1 | 8/2005 | Edwards et al. |
| 2004/0120399 A1 | 6/2004 | Kato | 2005/0196067 A1 | 9/2005 | Gallagher et al. |
| 2004/0120598 A1 | 6/2004 | Feng | 2005/0200736 A1 | 9/2005 | Ito |
| 2004/0125387 A1 | 7/2004 | Nagao et al. | 2005/0207649 A1 | 9/2005 | Enomoto et al. |
| 2004/0125756 A1* | 7/2004 | Lepore et al. ............... 709/227 | 2005/0212955 A1 | 9/2005 | Craig et al. |
| 2004/0126086 A1 | 7/2004 | Nakamura et al. | 2005/0219241 A1 | 10/2005 | Chun |
| 2004/0140981 A1 | 7/2004 | Clark | 2005/0219385 A1 | 10/2005 | Terakawa |
| 2004/0141657 A1 | 7/2004 | Jarman | 2005/0219608 A1 | 10/2005 | Wada |

| | | | | | | |
|---|---|---|---|---|---|---|
| 2005/0220346 A1 | 10/2005 | Akahori | | 2007/0047043 A1 | 3/2007 | Kapellner et al. |
| 2005/0220347 A1 | 10/2005 | Enomoto et al. | | 2007/0047768 A1 | 3/2007 | Gordon et al. |
| 2005/0226499 A1 | 10/2005 | Terakawa | | 2007/0053614 A1 | 3/2007 | Mori et al. |
| 2005/0232490 A1 | 10/2005 | Itagaki et al. | | 2007/0070440 A1 | 3/2007 | Li et al. |
| 2005/0238217 A1 | 10/2005 | Enomoto et al. | | 2007/0071347 A1 | 3/2007 | Li et al. |
| 2005/0238230 A1 | 10/2005 | Yoshida | | 2007/0091203 A1 | 4/2007 | Peker et al. |
| 2005/0243348 A1 | 11/2005 | Yonaha | | 2007/0094703 A1 | 4/2007 | Nygaard et al. |
| 2005/0251754 A1 | 11/2005 | Padgett et al. | | 2007/0098303 A1 | 5/2007 | Gallagher et al. |
| 2005/0275721 A1 | 12/2005 | Ishii | | 2007/0110305 A1 | 5/2007 | Corcoran et al. |
| 2005/0275734 A1 | 12/2005 | Ikeda | | 2007/0110417 A1 | 5/2007 | Itokawa |
| 2005/0276481 A1 | 12/2005 | Enomoto | | 2007/0116379 A1 | 5/2007 | Corcoran et al. |
| 2005/0280717 A1 | 12/2005 | Sugimoto | | 2007/0116380 A1 | 5/2007 | Ciuc et al. |
| 2005/0286766 A1 | 12/2005 | Ferman | | 2007/0122056 A1 | 5/2007 | Steinberg et al. |
| 2006/0006077 A1 | 1/2006 | Mosher et al. | | 2007/0133863 A1 | 6/2007 | Sakai et al. |
| 2006/0007306 A1 | 1/2006 | Masters et al. | | 2007/0133901 A1 | 6/2007 | Aiso |
| 2006/0008152 A1 | 1/2006 | Kumar et al. | | 2007/0154095 A1 | 7/2007 | Cao et al. |
| 2006/0008171 A1 | 1/2006 | Petschnigg et al. | | 2007/0154096 A1 | 7/2007 | Cao et al. |
| 2006/0008173 A1 | 1/2006 | Matsugu et al. | | 2007/0154189 A1 | 7/2007 | Harradine et al. |
| 2006/0017825 A1 | 1/2006 | Thakur | | 2007/0160307 A1 | 7/2007 | Steinberg et al. |
| 2006/0018025 A1 | 1/2006 | Sharon et al. | | 2007/0172126 A1 | 7/2007 | Kitamura |
| 2006/0018517 A1 | 1/2006 | Chen et al. | | 2007/0189606 A1 | 8/2007 | Ciuc et al. |
| 2006/0022895 A1 | 2/2006 | Williams et al. | | 2007/0189748 A1 | 8/2007 | Drimbarean et al. |
| 2006/0025092 A1 | 2/2006 | Sanders et al. | | 2007/0189757 A1 | 8/2007 | Steinberg et al. |
| 2006/0029265 A1 | 2/2006 | Kim et al. | | 2007/0201724 A1 | 8/2007 | Steinberg et al. |
| 2006/0038916 A1 | 2/2006 | Knoedgen et al. | | 2007/0201725 A1 | 8/2007 | Steinberg et al. |
| 2006/0039690 A1 | 2/2006 | Steinberg et al. | | 2007/0201726 A1 | 8/2007 | Steinberg et al. |
| 2006/0045352 A1 | 3/2006 | Gallagher | | 2007/0263104 A1 | 11/2007 | DeLuca et al. |
| 2006/0048194 A1 | 3/2006 | Poslinski | | 2007/0263928 A1 | 11/2007 | Akahori |
| 2006/0050300 A1 | 3/2006 | Mitani et al. | | 2007/0269108 A1 | 11/2007 | Steinberg et al. |
| 2006/0050933 A1 | 3/2006 | Adam et al. | | 2007/0273504 A1 | 11/2007 | Tran |
| 2006/0056655 A1 | 3/2006 | Wen et al. | | 2007/0296833 A1 | 12/2007 | Corcoran et al. |
| 2006/0066628 A1 | 3/2006 | Brodie et al. | | 2008/0002060 A1 | 1/2008 | DeLuca et al. |
| 2006/0082847 A1 | 4/2006 | Sugimoto | | 2008/0013798 A1 | 1/2008 | Ionita et al. |
| 2006/0093212 A1 | 5/2006 | Steinberg et al. | | 2008/0013799 A1 | 1/2008 | Steinberg et al. |
| 2006/0093213 A1 | 5/2006 | Steinberg et al. | | 2008/0013800 A1 | 1/2008 | Steinberg et al. |
| 2006/0093238 A1 | 5/2006 | Steinberg et al. | | 2008/0019565 A1 | 1/2008 | Steinberg |
| 2006/0098867 A1 | 5/2006 | Gallagher | | 2008/0031498 A1 | 2/2008 | Corcoran et al. |
| 2006/0098875 A1 | 5/2006 | Sugimoto | | 2008/0037827 A1 | 2/2008 | Corcoran et al. |
| 2006/0098890 A1 | 5/2006 | Steinberg et al. | | 2008/0037838 A1 | 2/2008 | Ianculescu et al. |
| 2006/0119832 A1 | 6/2006 | Iida | | 2008/0037839 A1 | 2/2008 | Corcoran et al. |
| 2006/0120599 A1 | 6/2006 | Steinberg et al. | | 2008/0037840 A1 | 2/2008 | Steinberg et al. |
| 2006/0126938 A1 | 6/2006 | Lee et al. | | 2008/0043121 A1 | 2/2008 | Prilutsky et al. |
| 2006/0133699 A1 | 6/2006 | Widrow et al. | | 2008/0043122 A1 | 2/2008 | Steinberg et al. |
| 2006/0140455 A1 | 6/2006 | Costache et al. | | 2008/0049970 A1 | 2/2008 | Ciuc et al. |
| 2006/0147192 A1 | 7/2006 | Zhang et al. | | 2008/0055433 A1 | 3/2008 | Steinberg et al. |
| 2006/0149811 A1 | 7/2006 | Bennett et al. | | 2008/0075385 A1 | 3/2008 | David et al. |
| 2006/0150089 A1 | 7/2006 | Jensen et al. | | 2008/0112599 A1 | 5/2008 | Nanu et al. |
| 2006/0153472 A1 | 7/2006 | Sakata et al. | | 2008/0143854 A1 | 6/2008 | Steinberg et al. |
| 2006/0177100 A1 | 8/2006 | Zhu et al. | | 2008/0144965 A1 | 6/2008 | Steinberg et al. |
| 2006/0177131 A1 | 8/2006 | Porikli | | 2008/0144966 A1 | 6/2008 | Steinberg et al. |
| 2006/0187305 A1 | 8/2006 | Trivedi et al. | | 2008/0175481 A1 | 7/2008 | Petrescu et al. |
| 2006/0200599 A1* | 9/2006 | Manchester et al. ............ 710/62 | | 2008/0186389 A1 | 8/2008 | DeLuca et al. |
| 2006/0203106 A1 | 9/2006 | Lawrence et al. | | 2008/0205712 A1 | 8/2008 | Ionita et al. |
| 2006/0203107 A1 | 9/2006 | Steinberg et al. | | 2008/0211937 A1 | 9/2008 | Steinberg et al. |
| 2006/0203108 A1 | 9/2006 | Steinberg et al. | | 2008/0219517 A1 | 9/2008 | Blonk et al. |
| 2006/0204034 A1 | 9/2006 | Steinberg et al. | | 2008/0232711 A1 | 9/2008 | Prilutsky et al. |
| 2006/0204052 A1 | 9/2006 | Yokouchi | | 2008/0240555 A1 | 10/2008 | Nanu et al. |
| 2006/0204054 A1 | 9/2006 | Steinberg et al. | | 2008/0250239 A1 | 10/2008 | Risan et al. |
| 2006/0204055 A1 | 9/2006 | Steinberg et al. | | 2008/0266419 A1 | 10/2008 | Drimbarean et al. |
| 2006/0204056 A1 | 9/2006 | Steinberg et al. | | 2008/0267461 A1 | 10/2008 | Ianculescu et al. |
| 2006/0204057 A1 | 9/2006 | Steinberg | | 2008/0292193 A1 | 11/2008 | Bigioi et al. |
| 2006/0204058 A1 | 9/2006 | Kim et al. | | 2008/0316327 A1 | 12/2008 | Steinberg et al. |
| 2006/0204110 A1 | 9/2006 | Steinberg et al. | | 2008/0316328 A1 | 12/2008 | Steinberg et al. |
| 2006/0210264 A1 | 9/2006 | Saga | | 2008/0317339 A1 | 12/2008 | Steinberg et al. |
| 2006/0215924 A1 | 9/2006 | Steinberg et al. | | 2008/0317357 A1 | 12/2008 | Steinberg et al. |
| 2006/0221408 A1 | 10/2006 | Fukuda | | 2008/0317378 A1 | 12/2008 | Steinberg et al. |
| 2006/0227997 A1 | 10/2006 | Au et al. | | 2008/0317379 A1 | 12/2008 | Steinberg et al. |
| 2006/0228037 A1 | 10/2006 | Simon et al. | | 2009/0002514 A1 | 1/2009 | Steinberg et al. |
| 2006/0245624 A1 | 11/2006 | Gallagher et al. | | 2009/0003652 A1 | 1/2009 | Steinberg et al. |
| 2006/0257047 A1 | 11/2006 | Kameyama et al. | | 2009/0003661 A1 | 1/2009 | Ionita et al. |
| 2006/0268150 A1 | 11/2006 | Kameyama et al. | | 2009/0003708 A1 | 1/2009 | Steinberg et al. |
| 2006/0269270 A1 | 11/2006 | Yoda et al. | | 2009/0052749 A1 | 2/2009 | Steinberg et al. |
| 2006/0279662 A1 | 12/2006 | Kapellner et al. | | 2009/0052750 A1 | 2/2009 | Steinberg et al. |
| 2006/0280380 A1 | 12/2006 | Li | | 2009/0080713 A1 | 3/2009 | Bigioi et al. |
| 2006/0282572 A1 | 12/2006 | Steinberg et al. | | 2009/0087030 A1 | 4/2009 | Steinberg et al. |
| 2006/0284982 A1 | 12/2006 | Bigioi et al. | | 2009/0115915 A1 | 5/2009 | Steinberg et al. |
| 2006/0285754 A1 | 12/2006 | Steinberg et al. | | 2009/0141144 A1 | 6/2009 | Steinberg |
| 2006/0291739 A1 | 12/2006 | Li et al. | | 2009/0175609 A1 | 7/2009 | Tan |
| 2007/0018966 A1 | 1/2007 | Blythe et al. | | 2009/0179998 A1 | 7/2009 | Steinberg et al. |

| | | | |
|---|---|---|---|
| 2009/0196466 A1 | 8/2009 | Capata et al. | |
| 2009/0208056 A1 | 8/2009 | Corcoran et al. | |
| 2009/0244296 A1 | 10/2009 | Petrescu et al. | |
| 2009/0245693 A1 | 10/2009 | Steinberg et al. | |
| 2009/0263022 A1 | 10/2009 | Petrescu et al. | |
| 2010/0026831 A1 | 2/2010 | Ciuc et al. | |
| 2010/0026832 A1 | 2/2010 | Ciuc et al. | |
| 2010/0026833 A1 | 2/2010 | Ciuc et al. | |
| 2010/0039525 A1 | 2/2010 | Steinberg et al. | |
| 2010/0053368 A1 | 3/2010 | Nanu et al. | |
| 2010/0054533 A1 | 3/2010 | Steinberg et al. | |
| 2010/0054549 A1 | 3/2010 | Steinberg et al. | |
| 2010/0092039 A1 | 4/2010 | Steinberg et al. | |
| 2010/0165140 A1 | 7/2010 | Steinberg | |
| 2010/0165150 A1 | 7/2010 | Steinberg et al. | |
| 2010/0188525 A1 | 7/2010 | Steinberg et al. | |
| 2010/0188530 A1 | 7/2010 | Steinberg et al. | |
| 2010/0220899 A1 | 9/2010 | Steinberg et al. | |
| 2010/0271499 A1 | 10/2010 | Steinberg et al. | |
| 2010/0272363 A1 | 10/2010 | Steinberg et al. | |
| 2011/0002545 A1 | 1/2011 | Steinberg et al. | |
| 2011/0013044 A1 | 1/2011 | Steinberg et al. | |

FOREIGN PATENT DOCUMENTS

| | | | |
|---|---|---|---|
| EP | 884694 A1 | 12/1998 | |
| EP | 911759 A2 | 4/1999 | |
| EP | 984386 A2 | 3/2000 | |
| EP | 911759 A3 | 6/2000 | |
| EP | 1039772 A1 | 9/2000 | |
| EP | 1128316 A1 | 8/2001 | |
| EP | 1199672 A2 | 4/2002 | |
| EP | 1229486 A1 | 8/2002 | |
| EP | 1288858 A1 | 3/2003 | |
| EP | 1288859 A1 | 3/2003 | |
| EP | 1288860 A1 | 3/2003 | |
| EP | 1293933 A1 | 3/2003 | |
| EP | 1296510 A2 | 3/2003 | |
| EP | 1398733 A1 | 3/2004 | |
| EP | 1429290 A2 | 6/2004 | |
| EP | 1441497 A2 | 7/2004 | |
| EP | 1453002 A2 | 9/2004 | |
| EP | 1478169 A2 | 11/2004 | |
| EP | 1528509 A2 | 5/2005 | |
| EP | 1626569 A1 | 2/2006 | |
| EP | 979487 B1 | 3/2006 | |
| EP | 1785914 A1 | 5/2007 | |
| EP | 1887511 A1 | 2/2008 | |
| EP | 1429290 B1 | 7/2008 | |
| EP | 2033142 A2 | 3/2009 | |
| EP | 2052349 A1 | 4/2009 | |
| EP | 2188759 A1 | 5/2010 | |
| GB | 841609 A | 7/1960 | |
| GB | 2370438 A1 | 6/2002 | |
| GB | 2379819 A | 3/2003 | |
| IE | 80161 A2 | 9/2008 | |
| JP | 3205989 A2 | 9/1991 | |
| JP | 4192681 A2 | 7/1992 | |
| JP | 5224271 A2 | 9/1993 | |
| JP | 5260360 A2 | 10/1993 | |
| JP | 7281285 A2 | 10/1995 | |
| JP | 9214839 A2 | 8/1997 | |
| JP | 10174009 A2 | 6/1998 | |
| JP | 2000-134486 A2 | 5/2000 | |
| JP | 2002-247596 A2 | 8/2002 | |
| JP | 2002-271808 A2 | 9/2002 | |
| JP | 2003-030647 A2 | 1/2003 | |
| JP | 2005-164475 A2 | 6/2005 | |
| JP | 2006-005662 A2 | 1/2006 | |
| JP | 2006072770 A | 3/2006 | |
| JP | 2006-254358 A2 | 9/2006 | |
| JP | 4448186 | 1/2010 | |
| WO | WO9802844 A1 | 1/1998 | |
| WO | WO9917254 A1 | 4/1999 | |
| WO | WO9933684 A2 | 7/1999 | |
| WO | WO0076398 A1 | 12/2000 | |
| WO | WO0133497 A1 | 5/2001 | |
| WO | WO0135664 A2 | 5/2001 | |
| WO | WO0171421 A1 | 9/2001 | |
| WO | WO0192614 A1 | 12/2001 | |
| WO | WO0245003 A1 | 6/2002 | |
| WO | WO02052835 A2 | 7/2002 | |
| WO | WO03026278 A1 | 3/2003 | |
| WO | WO03028377 A1 | 4/2003 | |
| WO | WO03071484 A1 | 8/2003 | |
| WO | WO2004034696 A1 | 4/2004 | |
| WO | WO2005015896 A1 | 2/2005 | |
| WO | WO2005041558 A1 | 5/2005 | |
| WO | WO2005076217 A2 | 8/2005 | |
| WO | WO2005076217 A3 | 8/2005 | |
| WO | WO2005087994 A1 | 9/2005 | |
| WO | WO2005109853 A1 | 11/2005 | |
| WO | WO2006011635 A1 | 2/2006 | |
| WO | WO2006018056 A1 | 2/2006 | |
| WO | WO2006045441 A1 | 5/2006 | |
| WO | WO2006093623 A1 | 9/2006 | |
| WO | WO2006119877 A1 | 11/2006 | |
| WO | WO2006133764 A2 | 12/2006 | |
| WO | WO2006133764 A3 | 12/2006 | |
| WO | WO2007057063 A1 | 5/2007 | |
| WO | WO2007057064 A1 | 5/2007 | |
| WO | WO2007093199 A2 | 8/2007 | |
| WO | WO2007093199 A3 | 8/2007 | |
| WO | WO2007095477 A2 | 8/2007 | |
| WO | WO2007095477 A3 | 8/2007 | |
| WO | WO2007095483 A2 | 8/2007 | |
| WO | WO2007095553 A2 | 8/2007 | |
| WO | WO2007095553 A3 | 8/2007 | |
| WO | WO2007128117 A1 | 11/2007 | |
| WO | WO2007142621 A1 | 12/2007 | |
| WO | WO2008015586 A2 | 2/2008 | |
| WO | WO2008015586 A3 | 2/2008 | |
| WO | WO2008017343 A1 | 2/2008 | |
| WO | WO2008018887 A1 | 2/2008 | |
| WO | WO2008021945 A2 | 2/2008 | |
| WO | WO2008023280 A2 | 2/2008 | |
| WO | WO2008054422 A2 | 5/2008 | |
| WO | WO2008104549 A2 | 9/2008 | |
| WO | WO2008107002 A1 | 9/2008 | |
| WO | WO2008107112 A2 | 9/2008 | |
| WO | WO2008109644 A2 | 9/2008 | |
| WO | WO2008109644 A3 | 9/2008 | |
| WO | WO2008131823 A1 | 11/2008 | |
| WO | WO2008150285 A1 | 12/2008 | |
| WO | WO2008157792 A1 | 12/2008 | |
| WO | WO2009039876 A1 | 4/2009 | |
| WO | WO2010012448 A2 | 2/2010 | |
| WO | WO2010017953 A1 | 2/2010 | |
| WO | WO2010025908 A1 | 3/2010 | |
| WO | WO2011000841 A1 | 1/2011 | |

OTHER PUBLICATIONS

Aoki, Hiroyuki et al., "An Image Storage System Using Complex-Valued Associative Memories, Abstract printed from http://csdl.computer.org/comp/proceedings/icpr/2000/0750/02/07502626abs.htm", International Conference on Pattern Recognition (ICPR '00), 2000, vol. 2.

Batur et al., "Adaptive Active Appearance Models", IEEE Transactions on Image Processing, 2005, pp. 1707-1721, vol. 14—Issue 11.

Beraldin, J.A. et al., "Object Model Creation from Multiple Range Images: Acquisition, Calibration, Model Building and Verification, Abstract printed from http://csdl.computer.org/comp/proceedings/nrc/1997/7943/00/79430326abs.htm", International Conference on Recent Advances in 3-D Digital Imaging and Modeling, 1997.

Beymer, David, "Pose-Invariant face Recognition Using Real and Virtual Views, A.I. Technical Report No. 1574", Massachusetts Institute of Technology Artificial Intelligence Laboratory, 1996, pp. 1-176.

Bigioi, P. et al., "Digital camera connectivity solutions using the picture transfer protocol (PTP)", IEEE Transactions on Consumer Electronics, 2002, pp. 417-427, vol. 48—Issue 3.

Bigioi, P. et al., "PTP/IP—a new transport specification for wireless photography", IEEE Transactions on Consumer Electronics, 2005, vol. 51.

Bradski Gary et al., "Learning-Based Computer Vision with Intel's Open Source Computer Vision Library", Intel Technology, 2005, pp. 119-130, vol. 9—Issue 2. .

Buenaposada, J., "Efficiently estimating 1-3,16 facial expression and illumination in appearance—based tracking, Retrieved from the Internet: URL:http://www.bmva.ac.uk/bmvc/2006/ > [retrieved on Sep. 1, 2008]", Proc. British machine vision conference, 2006.

Canon, "PowerShot G1, Camera User Guide" and "Software Starter Guide", 2000.

Chang, T., "Texture Analysis and Classification with Tree-Structured Wavelet Transform", IEEE Transactions on Image Processing, 1993, pp. 429-441, vol. 2—Issue 4.

CIPA DC-001-2003: "Digital Photo Solutions for Imaging Devices," Published by Camera & Imaging Products Association, PictBridge Standard of Camera & Imaging Products Association, Feb. 3, 2003, http://www.cipajp/pictbridge/contents_e/03overview e.html.

CIPA DC-005-2005: "'Picture Transfer Protocol' over TCP/IP Networks," Published by Camera & Imaging Products Association, CIPA Standard of the Camera & Imaging Products Association, Nov. 8, 2005, http://www.cipa.jp/ptp-ip/documents_e/CIPA_DC-005_Whitepap, 6 pages.

CIPA, Digital Photo Solutions for Imaging Devices, 2003, CIPA, pp. 1-6.

Combier, Nathalie et al., "Removal of Defects on Flash Radiographic Images by Fuzzy Combination, Conference: Machine Vision Applications in Industrial Inspection III, http://rlinks2.dialog.com/NASApp/ChannelWEB/DialogProServlet?ChName=engineering", Proceedings of SPIE—The International Society for Optical Engineering, Society of Photo-Optical Instrumentation, 1995, pp. 301-312.

Cootes T. et al., "Modeling Facial Shape and Appearance, S. Li and K. K. Jain (Eds.): "Handbook of face recognition", XP002494037", 2005, Chapter 3, Springer.

Cootes, T.F. et al., "A comparative evaluation of active appearance model algorithms", Proc. 9th British Machine Vision Conference. British Machine Vision Association, 1998, pp. 680-689.

Cootes, T.F. et al., "On representing edge structure for model matching", Proc. IEEE Computer Vision and Pattern Recognition, 2001, pp. 1114-1119.

Co-pending U.S. Appl. No. 12/026,484.
Co-pending U.S. Appl. No. 12/055,958.
Co-pending U.S. Appl. No. 12/198,533.
Co-pending U.S. Appl. No. 12/198,621.
Co-pending U.S. Appl. No. 12/302,493.
Co-pending U.S. Appl. No. 12/331,334.
Co-pending U.S. Appl. No. 12/790,594.
Co-pending U.S. Appl. No. 12/825,280.
Co-pending U.S. Appl. No. 12/827,868.
Co-pending U.S. Appl. No. 12/843,805.
Co-pending U.S. Appl. No. 12/890,185.
Co-pending U.S. Appl. No. 12/892,935.

Corcoran, P. et al., "Automated In-Camera Detection of Flash-Eye Defects", IEEE Transactions on Consumer Electronics, 2005, pp. 11-17, vol. 51—Issue 1.

Corcoran, P. et al., "Automatic Indexing of Consumer Image Collections Using Person Recognition Techniques", Digest of Technical Papers. International Conference on Consumer Electronics, 2005, pp. 127-128.

Corcoran, P.M. et al., "Internet enabled digital photography", IEEE Transactions on Consumer Electronics, 1999, pp. 577-583, vol. 45.

Corcoran, P.M. et al., "Wireless transfer of images from a digital camera to the Internet via a standard GSM mobile phone", IEEE Transactions on Consumer Electronics, 2001, pp. 542-547, vol. 47.

Costache, G. et al., "In-Camera Person-Indexing of Digital Images", Digest of Technical Papers. International Conference on Consumer Electronics, 2006, pp. 339-340.

Crowley, J. et al., "Multi-modal tracking of faces for video communication, http://citeseer.ist.psu.edu/crowley97multimodal.html", In Computer Vision and Patent Recognition, 1997.

Cucchiara, R. et al., "Detection of Luminosity Profiles of Elongated Shapes", International Conference on Image Processing, 1996, pp. 635-638, vol. 3.

Dalton, John, "Digital Cameras and Electronic Color Image Acquisition, Abstract printed from http://csdl.computer.org/comp/proceedings/compcon/1996/7414/00/74140431abs.htm", COMPCON Spring '96—41st IEEE International Conference, 1996.

Dell, "Owner's Manual—Dell Inspiron 1100", 2003.

Demirkir, C. et al., "Face detection using boosted tree classifier stages", Proceedings of the IEEE 12th Signal Processing and Communications Applications Conference, 2004, pp. 575-578.

Deng, Ya-Feng et al., "Fast and Robust face detection in video, http://rlinks2.dialog.com/NASApp/ChannelWEB/DialogProServlet?ChName=engineering", International Conference on Machine Learning and Cybernetics, 2005.

Digital-Album by Nixvue Systems Ltd. (www.nixvue.com).

Donner, Rene et al., "Fast Active Appearance Model Search Using Canonical Correlation Analysis", IEEE Transactions on Pattern Analysis and Machine Intelligence, 2006, pp. 1690-1694, vol. 28—Issue 10.

Drimbarean, A.F. et al., "Image Processing Techniques to Detect and Filter Objectionable Images based on Skin Tone and Shape Recognition", International Conference on Consumer Electronics, 2001, pp. 278-279.

Edwards, G.J. et al., "Advances in active appearance models", International Conference on Computer Vision (ICCV'99), 1999, pp. 137-142.

Edwards, G.J. et al., "Learning to identify and track faces in image sequences, Automatic Face and Gesture Recognition", IEEE Comput. Soc, 1998, pp. 260-265.

EPO Communication pursuant to Article 94(3) EPC, for European Patent Application No. 05 792 584.4, paper dated May 13, 2008, 8 pages.

European Patent Office, Communication pursuant to Article 94(3) EPC for Application No. 04763763.2, dated Mar. 7, 2008, 7 pages.

European Patent Office, Communication pursuant to Article 96(2) EPC for Application No. 04763763.2, dated Aug. 29, 2006, 4 pages.

Examination Report for European Patent Application No. 06742746.8, dated Mar. 6, 2008, 5 pages.

Feraud, R. et al., "A Fast and Accurate Face Detector Based on Neural Networks", IEEE Transactions on Pattern Analysis and Machine Intelligence, 2001, pp. 42-53, vol. 23—Issue 1.

Fernandez, Anna T. et al., "Synthetic Elevation Beamforming and Image Acquisition Capabilities Using an 8x 128 1.75D Array, Abstract Printed from http://www.ieee-uffc.org/archive/uffc/trans/toc/abs/03/t0310040.htm", The Technical Institute of Electrical and Electronics Engineers.

Final Office Action mailed Apr. 26, 2010, for U.S. Appl. No. 10/773,092, filed Feb. 4, 2004.

Final Office Action mailed Apr. 26, 2010, for U.S. Appl. No. 11/690,834, filed Mar. 25, 2007.

Final Office Action mailed Apr. 26, 2010, for U.S. Appl. No. 11/772,427, filed Feb. 2, 2007.

Final Office Action mailed Apr. 26, 2010, for U.S. Appl. No. 12/035,416, filed Feb. 21, 2008.

Final Office Action mailed Feb. 8, 2008, for U.S. Appl. No. 11/123,961, filed May 6, 2005.

Final Office Action mailed Feb. 20, 2008, for U.S. Appl. No. 11/156,235, filed Jun. 17, 2005.

Final Office Action mailed Jan. 7, 2009, for U.S. Appl. No. 11/156,235, filed Jun. 17, 2005.

Final Office Action mailed Jan. 28, 2008, for U.S. Appl. No. 11/123,972, filed May 6, 2005.

Final Office Action mailed Mar 23, 2010, for U.S. Appl. No. 11/688,236, filed Mar. 19, 2007.

Final Office Action mailed Mar. 24, 2010, for U.S. Appl. No. 11/462,035, filed Aug 2, 2006.

Final Office Action mailed Nov. 9, 2010, for U.S. Appl. No. 11/462,035, filed Aug 2, 2006.

Final Office Action mailed Nov. 12, 2008, for U.S. Appl. No. 11/123,972, filed May 6, 2005.

Final Office Action mailed Nov. 18, 2009, for U.S. Appl. No. 11/554,539, filed Oct. 30, 2006.

Final Office Action mailed Nov. 20, 2009, for U.S. Appl. No. 12/192,897, filed Aug. 15, 2008.

Final Office Action mailed Oct. 13, 2010, for U.S. Appl. No. 11/765,899, filed Jun 20, 2007.

Final Office Action mailed Oct. 28, 2010, for U.S. Appl. No. 11/835,790 filed Aug. 8, 2007.

Final Office Action mailed Sep. 1, 2009, for U.S. Appl. No. 11/841,855, filed Aug. 20, 2007.
Final Office Action mailed Sep. 1, 2010, for U.S. Appl. No. 10/608,784, filed Jun 26, 2003.
Final Office Action mailed Sep. 22, 2010, for U.S. Appl. No. 11/688,236, filed Mar. 19, 2007.
Final Office Action mailed Sep. 30, 2010, for U.S. Appl. No. 11/624,683, filed Jan. 18, 2007.
Fotonation Inc.: "PTP over IP The state of the development" Internet, Sep. 2004, XP002390455 Retrieved from the Internet: URL: http://www.i3a.org/pdf/PTPIP_Technical_Overview_Oct2004.pdf.
Froba, B. et al., "Face detection with the modified census transform", Proceedings of The Sixth IEEE International Conference on Automatic Face and Gesture Recognition, 2004, pp. 91-96.
Froba, B. et al., "Real time face detection, Kauai, Hawaii Retrieved from the Internet: URL: http://www.embassi.de/publi/veroeffent/Froeba.pdf > [retrieved on Oct. 23, 2007]", Dept. of Applied Electronics, Proceedings of lasted "Signal and Image Processing", 2002, pp. 1-6.
Gangaputra, Sachin et al., "A Unified Stochastic Model for Detecting and Tracking Faces, http://portal.acm.org/citation.cfm?id=1068818& coll=GUIDE&d1=GUIDE&CFid=ID=6809268&CFTOKEN=82843223", Proceedings of the The 2nd Canadian Conference on Computer and Robot Vision (CRV 2005), 2005, pp. 306-313, vol. 00, IEEE Computer Society.
Garnaoui, H.H. et al., "Visual Masking and the Design of Magnetic Resonance Image Acquisition, Abstract printed from http://csdl.computer.org/comp/proceedings/icip/1995/7310/01/73100625abs.htm", International Conference on Image Processing, 1995, vol. 1.
Gaubatz, Matthew et al., "Automatic Red-Eye Detection and Correction", IEEE ICIP, Proceedings 2002 International Conference on Image Processing, 2002, pp. 1-804-1-807, vol. 2—Issue 3.
Gerbrands, J., "On the Relationships Between SVD, KLT, and PCA", Pattern Recognition, 1981, pp. 375-381, vol. 14, Nos. 1-6.
Goodall, C., "Procrustes Methods in the Statistical Analysis of Shape, Stable URL: http://www.jstor.org/stable/2345744", Journal of the Royal Statistical Society. Series B (Methodological), 1991, pp. 285-339, vol. 53—Issue 2, Blackwell Publishing for the Royal Statistical Society.
Han, T. et al., "Detection and Correction of abnormal Pixels in Hyperion Images", IEEE International Symposium on Geoscience and Remote Sensing, 2002, pp. 1327-1330, vol. 3.
Harguess J et al., "Harguess J, et al., "A case for the average-half-face in 2D and 3D for face recognition," Computer Vision and Pattern Recognition Workshops, 2009, IEEE Computer Society Conference on, IEEE, Piscataway, NJ, USA, 07-12.", IEEE Computer Society Conference on, IEEE, Piscataway, NJ, USA, 2009, 7-12.
Hayashi, S. et al., "A Detection Technique for Degraded Face Images", Conference on Computer Vision and Pattern Recognition, 2006, pp. 1506 1512, vol. 2, IEEE Computer Society.
Heisele, B. et al., "Hierarchical Classification and Feature Reduction for Fast Face Detection with Support Vector Machines", Pattern Recognition, 2003, pp. 2007-2017, vol. 36—Issue 9, Elsevier.
Hewlett Packard, hp psc 2500 photosmart series all-in-one, 2003, Hewlett Packard, pp. 6-8, 29, 141 and 142.
Hou, Xinwen et al., "Direct Appearance Models", IEEE, 2001, pp. 1-828-1-833.
Hu, Wen-Chen et al., "A Line String Image Representation for Image Storage and Retrieval, Abstract printed from http://csdl.computer.oro/comp/proceedings/icmcs/1997/7819/00/78190434abs.htm", International Conference on Multimedia Computing and systems, 1997.
Huang et al., "Image Indexing Using Color Correlograms", Proceedings of the 1997 Conference on Computer Vision and Pattern Recognition (CVPR '97), 1997, pp. 762.
Huang, J. et al., "Detection of human faces using decision trees, http://doLieeecomputersociety.org/10.1109/Recognition", 2nd International Conference on Automatic Face and Gesture Recognition (FG '96), IEEE Xplore, 2001, p. 248.
Huber, Reinhold et al., "Adaptive Aperture Control for Image Acquisition, Abstract printed from http://csdl.computer.org/comp/proceedings/wacv/2002/1858/00/18580320abs.htm. cited by other", Sixth IEEE Workshop on Applications of Computer Vision, 2002.
Iivarinen, J. et al., "Content-Based Retrieval of Defect Images, http://www.cs.tut.fi/.about.avisa/digger/Publications/acivs02.pdf", Proceedings of Advanced Concepts for Intelligent Vision, Laboratory of Computer Information Science, 2002.
Interact-TV, "Telly: The Home Entertainment Server", Jun. 22, 2004, "http://web.archive.org/web/20040622083339/interacttv.com/products.php".
Ioffe, S., "Red eye detection with machine learning", Proceedings 2003 International Conference on Image Processing, 2003, pp. 871-874, vol. 2—Issue 3.
ISO 15740 Enables Seamless Image Transfer Between Devices, Sep. 26, 2005, 3 pages, http://www.i3a.org/pr_09_26_05.html.
Isukapalli, Ramana et al., "Learning a dynamic classification method to detect faces and identify facial expression, http://rlinks2.dialog.com/NASApp/ChannelWEB/DialogProServlet?ChName=engineering", International Workshop on Analysis and Modelling of Faces and Gestures, AMFG 2005, in Lecture Notes in Computer Science, 2005, vol. 3723.
Ito, M., "An Automated System for LSI Fine Pattern Inspection Based on Comparison of Sem Images and Cad Data", IEEE International Conference on Robotics and Automation, 1995, pp. 544-549, vol. 1.
Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Department of Electrical Engineering, 1996, pp. 1-121, McGill University.
Jin, B. et al., "Modeling and Analysis of Soft-Test/Repair for CCD-Based Digital X-Ray Systems", Instrumentation and Measurement, IEEE Transactions, 2003, pp. 1713-1721, vol. 52—Issue 6.
Jones, M et al., "Fast multi-view face detection, http://www.merl.com/papers/docs/TR2003-96.pdf", Mitsubishi Electric Research Lab, 2003, 10 pgs.
Kang, Sing Bing et al., A Multibaseline Stereo System with Active Illumination and Real-Time Image Acquisition, Fifth International Conference on Computer Vision, 1995.Abstract printed from http://csdl.computer.org/comp/proceedings/iccv/1995/7042/00/70420088abs.htm.
Kita, Nobuyuki et al., Archiving Technology for Plant Inspection Images Captured by Mobile Active Cameras—4D Visible Memory, 1st International Symposium on 3D Data Processing Visualization and Transmission (3DPVT '02), 2002. Abstract printed from http://csdl.computer.org/comp/proceedings/3dpvt/2002/1521/00/15210208abs.htm.
Kouzani, A.Z., "Illumination-Effects Compensation in Facial Images Systems", Man and Cybernetics, IEEE SMC '99 Conference Proceedings, 1999, pp. VI-840-VI-844, vol. 6.
Kozubek, Michel et al., "Automated Multi-view 3D Image Acquisition in Human Genome Research, Abstract printed from http://csdl.computer.org/comp/proceedings/3pvt/2002/1521/00/15210091abs.htm", 1st International Symposium on 3D Data Processing Visualization and Transmission (3DPVT '02), 2002.
Krishnan, Arun, "Panoramic Image Acquisition, Abstract printed from http://csdl.computer.org/comp/proceedings/cypr/1996/7258/00/72580379abs.htm", Conference on Computer Vision and Pattern Recognition (CVPR '96), 1996.
Lai, J.H. et al., Face recognition using holistic Fourier in variant features, Pattern Recognition, 2001, pp. 95-109, vol. 34, http://digitalimaging.inf.brad.ac.uk/publication/pr34-1.pdf.
Lei et al., "A CBIR Method Based on Color-Spatial Feature", IEEE Region 10th Ann. Int. Conf., 1999.
Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.
Machin, et al., "Real Time Facial Motion Analysis for Virtual Teleconferencing," IEEE, 1996, pp. 340-344.
Matkovic, Kresimir et al., "The 3D Wunderkammer an Indexing by Placing Approach to the Image Storage and Retrieval, Abstract printed from http://csdl.computer.org/comp/proceedings/tocg/2003/1942/00/19420034abs.htm", Theory and Practice of Computer Graphics, 2003, University of Birmingham.

Matthews, I. et al., "Active appearance models revisited, Retrieved from http://www.d.cmu.edu/pub_files/pub4/matthews_iain_2004_2/matthews_iain_2004_2.pdf", International Journal of Computer Vision, 2004, pp. 135-164, vol. 60—Issue 2.

Media Transfer Protocol Enhanced, Revision 0.83.

Media Transfer Protocol Specification, msdn.microsoft.com/library/defaultasp?urt4library/en-us/dnwmt/html/mtp spec.asp.

Mekuz, N. et al., "Adaptive Step Size Window Matching for Detection", Proceedings of the 18th International Conference on Pattern Recognition, 2006, pp. 259-262, vol. 2.

Microsoft, Computer Dictionary, 1997, Microsoft Press, Third Edition, p. 225.

Ming, et al., "Human Face Orientation Estimation Using Symmetry and Feature Points Analysis," IEEE, 2000, pp. 1419-1422.

Mitra, S. et al., "Gaussian Mixture Models Based on the Frequency Spectra for Human Identification and Illumination Classification", Proceedings of the Fourth IEEE Workshop on Automatic Identification Advanced Technologies, 2005, pp. 245-250.

Moghaddam, Baback et al., "Bayesian Modeling of Facial Similarity, http://citeseer.ist.psu.edu/article/moghaddam98bayesian.html", Advances in Neural Information Processing Systems (NIPS 1998), 1998, pp. 910-916.

Nayak et al., "Automatic illumination correction for scene enhancement and objection tracking, XP005600656, ISSN: 0262- 8856", Image and Vision Computing, 2006, pp. 949-959, vol. 24—Issue 9.

Nguyen, Karlene et al., "Differences in the Infrared Bright Pupil Response of Human Eyes", Proceedings of the 2002 symposium on Eye tracking research & applications, 2002, pp. 133-138.

Nikon Report: "Das Nikon Neuigkeiten-Archiv" News-Archiv, Feb. 2005 XP002390456 Internet.

Nikon Wireless Transmitter "WT-2", Users's Manual—55 pp.

Non-Final Office Action mailed Apr. 2, 2010, for U.S. Appl. No. 10/608,784, filed Jun. 26, 2003.

Non-Final Office Action mailed Apr. 29, 2009, for U.S. Appl. No. 11/156,235, filed Jun. 17, 2005.

Non-Final Office Action mailed Apr. 30, 2010, for U.S. Appl. No. 11/765,899, filed Jun. 20, 2007.

Non-Final Office Action mailed Aug. 2, 2010, for U.S. Appl. No. 11/688,236, filed Mar. 19, 2007.

Non-Final Office Action mailed Aug 19, 2009, for U.S. Appl. No. 11/773,815, filed Jul. 5, 2007.

Non-Final Office Action mailed Aug. 20, 2009, for U.S. Appl. No. 11/773,855, filed Jul. 5, 2007.

Non-Final Office Action mailed Aug. 21, 2007, for U.S. Appl. No. 11/123,961, filed May 6, 2005.

Non-Final Office Action mailed Aug. 30, 2010, for U.S. Appl. No. 11/841,855, filed Aug. 20, 2007.

Non-Final Office Action mailed Aug. 31, 2009, for U.S. Appl. No. 11/462,035, filed Aug. 2, 2006.

Non-Final Office Action mailed Aug. 5, 2010, for U.S. Appl. No. 11/462,035, filed Aug. 2, 2006.

Non-Final Office Action mailed Dec. 7, 2010, for U.S. Appl. No. 12/206,617, filed Sep. 8, 2008.

Non-Final Office Action mailed Dec. 10, 2009, for U.S. Appl. No. 11/294,628, filed Dec. 2, 2005.

Non-Final Office Action mailed Dec. 10, 2010, for U.S. Appl. No. 11/761,647, filed Jun. 12, 2007.

Non-Final Office Action mailed Jan. 20, 2010, for U.S. Appl. No. 12/262,024, filed Oct. 30, 2008.

Non-Final Office Action mailed Jul. 9, 2008, for U.S. Appl. No. 11/123,961, filed May 6, 2005.

Non-Final Office Action mailed Jul. 9, 2008, for U.S. Appl. No. 11/123,972, filed May 6, 2005.

Non-Final Office Action mailed Jul. 14, 2009, for U.S. Appl. No. 12/192,897, filed Aug. 15, 2008.

Non-Final Office Action mailed Jul. 23, 2008, for U.S. Appl. No. 11/156,235, filed Jun. 17, 2005.

Non-Final Office Action mailed Jun. 14, 2010, for U.S. Appl. No. 11/624,683, filed Jan. 18, 2007.

Non-Final Office Action mailed Jun. 16, 2010, for U.S. Appl. No. 12/482,305, filed Jun. 10, 2009.

Non-Final Office Action mailed Jun. 22, 2010, for U.S. Appl. No. 12/055,958, filed Mar. 26, 2008.

Non-Final Office Action mailed Jun. 23, 2010, for U.S. Appl. No. 11/941,956, filed Nov. 18, 2007.

Non-Final Office Action mailed Mar. 18, 2010, for U.S. Appl. No. 11/835,790, filed Aug. 8, 2007.

Non-Final Office Action mailed Mar. 9, 2010, for U.S. Appl. No. 12/192,897, filed Aug. 15, 2008.

Non-Final Office Action mailed May 3, 2010, for U.S. Appl. No. 12/187,763, filed Aug. 7, 2008.

Non-Final Office Action mailed May 4, 2010, for U.S. Appl. No. 12/192,335, filed Aug. 15, 2008.

Non-Final Office Action mailed May 12, 2010, for U.S. Appl. No. 11/554,539, filed Oct. 30, 2007.

Non-Final Office Action mailed May 20, 2009, for U.S. Appl. No. 11/123,961, filed May 6, 2005.

Non-Final Office Action mailed May 28, 2009, for U.S. Appl. No. 11/123,972, filed May 6, 2005.

Non-Final Office Action mailed Nov. 30, 2010, for U.S. Appl. No. 11/861,257, filed Sep. 25, 2007.

Non-Final Office Action mailed Oct. 3, 2007, for U.S. Appl. No. 11/156,235, filed Jun. 17, 2005.

Non-Final Office Action mailed Oct. 5, 2009, for U.S. Appl. No. 10/919,226, filed Aug. 16, 2004.

Non-Final Office Action mailed Oct. 7, 2009, for U.S. Appl. No. 12/119,614, filed May 13, 2008.

Non-Final Office Action mailed Oct. 29, 2009, for U.S. Appl. No. 12/194,148, filed Aug. 19, 2008.

Non-Final Office Action mailed Sep. 8, 2009, for U.S. Appl. No. 11/688,236, filed Mar. 19, 2007.

Non-Final Office Action mailed Sep. 12, 2007, for U.S. Appl. No. 11/123,972, filed May 6, 2005.

Non-Final Office Action mailed Sep. 17, 2010, for U.S. Appl. No. 11/690,834, filed Mar. 25, 2007.

Non-Final Office Action mailed Sep. 21, 2010, for U.S. Appl. No. 10/773,092, filed Feb. 4, 2004.

Non-Final Office Action mailed Sep. 28, 2010, for U.S. Appl. No. 11/752,925, filed May 24, 2007.

Nordstrom, M.M. et al., "The IMM face database an annotated dataset of 240 face images, http://www2.imm.dtu.dk/pubdb/p.php?3160", Informatics and Mathematical Modelling, 2004.

Notice of Allowance mailed Aug. 23, 2010, for U.S. Appl. No. 12/262,024, filed Oct. 30, 2008.

Notice of Allowance mailed Dec. 10, 2010, for U.S. Appl. No. 11/462,035, filed Aug. 2, 2006.

Notice of Allowance mailed Dec. 24, 2009, for U.S. Appl. No. 11/123,972, filed May 6, 2005.

Notice of Allowance mailed Feb. 1, 2010, for U.S. Appl. No. 10/919,226, filed Aug. 16, 2004.

Notice of Allowance mailed Feb. 19, 2010, for U.S. Appl. No. 12/119,614, filed May 13, 2008.

Notice of Allowance mailed Feb. 19, 2010, for U.S. Appl. No. 12/194,148, filed Aug. 19, 2008.

Notice of Allowance mailed Jan. 4, 2010, for U.S. Appl. No. 11/123,961, filed May 6, 2005.

Notice of Allowance mailed Jun. 10, 2010, for U.S. Appl. No. 12/262,024, filed Oct. 30, 2008.

Notice of Allowance mailed Jun. 25, 2010, for U.S. Appl. No. 11/294,628, filed Dec. 2, 2005.

Notice of Allowance mailed Jun. 27, 2010, for U.S. Appl. No. 12/192,897, filed Aug. 15, 2008.

Notice of Allowance mailed Nov. 18, 2009, for U.S. Appl. No. 11/282,954, filed Nov. 18, 2005.

Notice of Allowance mailed Oct. 5, 2010, for U.S. Appl. No. 12/262,071, filed Oct. 30, 2008.

Notice of Allowance mailed Oct. 13, 2010, for U.S. Appl. No. 12/482,305, filed Jun. 10, 2009.

Notice of Allowance mailed Oct. 15, 2010, for U.S. Appl. No. 11/554,539, filed Oct. 30, 2006.

Notice of Allowance mailed Oct. 22, 2010, for U.S. Appl. No. 12/187,763, filed Aug. 7, 2008.

Notice of Allowance mailed Oct. 22, 2010, for U.S. Appl. No. 12/262,061, filed Oct. 30, 2008.

Notice of Allowance mailed Oct. 28, 2010, for U.S. Appl. No. 12/055,958, filed Mar. 26, 2008.

Notice of Allowance mailed Oct. 28, 2010, for U.S. Appl. No. 12/192,335, filed Aug. 15, 2008.
Notice of Allowance mailed Oct. 28, 2010, for U.S. Appl. No. 11/690,834, filed Mar. 25, 2007.
Notice of Allowance mailed Sep. 2, 2010, for U.S. Appl. No. 12/262,071, filed Oct. 30, 2008.
Notice of Allowance mailed Sep. 3, 2010, for U.S. Appl. No. 12/262,061, filed Oct. 30, 2008.
Notice of Allowance mailed Sep. 8, 2010, for U.S. Appl. No. 11/554,539, filed Oct. 30, 2006.
Notice of Allowance mailed Sep. 28, 2009, for U.S. Appl. No. 12/262,037, filed Oct. 30, 2008.
Ohta, Y-I et al., "Color Information for Region Segmentation, XP008026458", Computer Graphics and Image Processing, 1980, pp. 222-241, vol. 13—Issue 3, Academic Press.
Park, Daechul et al., "Lenticular Stereoscopic Imaging and Displaying Techniques with no Special Glasses, Abstract printed from http://csdl.computer.org/comp/proceedings/icip/1995/7310/03/73103137abs.htm", International Conference on Image Processing, 1995, vol. 3.
Patent Abstract of Japan, vol. 1, 1998, No. 11, Sep. 30, 1998 & JP 10-174009 A, Jun. 26, 1998.
Patent Abstracts of Japan, publication No. 2000050062, Image Input Device, application No. 10-217124, published Feb. 18, 2000, 1 page.
PCT International Preliminary Report on Patentability for PCT Application No. PCT/EP2005/005907, dated Nov. 15, 2006, 8 pages.
PCT International Preliminary Report on Patentability for PCT Application No. PCT/EP2006/003999, dated Dec. 17, 2007, 13 pages.
PCT International Preliminary Report on Patentability for PCT Application PCT/EP2004/008706, dated Feb. 6, 2006, 7 pages.
PCT International Preliminary Report on Patentability for PCT Application PCT/EP2004/010199, dated Apr. 3, 2006, 7 pages.
PCT International Preliminary Report on Patentability (IPRP) for PCT Application PCT/EP2005/011010, dated Jan. 23, 2007, 18 pages.
PCT International Preliminary Report on Patentability (IPRP) for PCT Application PCT/EP2007/009763, dated Sep. 11, 2009, 8 pages.
PCT International Search Report and the Written Opinion of the International Searching Authority, for PCT Application No. PCT/EP2004/0008706, dated Nov. 19, 2004, 9 pages.
PCT International Search Report and the Written Opinion of the International Searching Authority, for PCT Application No. PCT/EP2005/0001171, dated Jan. 27, 2006, 9 pages.
PCT International Search Report and the Written Opinion of the International Searching Authority, for PCT Application No. PCT/EP2005/0005907, dated Aug. 1, 2005, 10 pages.
PCT International Search Report and the Written Opinion of the International Searching Authority, for PCT Application No. PCT/EP2005/0011010, dated Jan. 23, 2006, 10 pages.
PCT International Search Report and the Written Opinion of the International Searching Authority, for PCT Application No. PCT/EP2006/0003999, dated Jan. 30, 2007, 16 pages.
PCT International Search Report and the Written Opinion of the International Searching Authority, for PCT Application No. PCT/EP2006/0004006, dated Jul. 5, 2006, 8 pages.
PCT International Search Report and the Written Opinion of the International Searching Authority, for PCT Application No. PCT/EP2006/0008342, dated Dec. 28, 2006, 8 pages.
PCT International Search Report and the Written Opinion of the International Searching Authority, for PCT Application No. PCT/EP2006/0008358, dated Jul. 5, 2006, 8 pages.
PCT International Search Report and the Written Opinion of the International Searching Authority for PCT Application No. PCT/EP2006/004006, dated Jun. 26, 2006, 8 pages.
PCT International Search Report and the Written Opinion of the International Searching Authority, for PCT Application No. PCT/EP2007/0006540, dated Nov. 8, 2007, 9 pages.
PCT International Search Report and the Written Opinion of the International Searching Authority, for PCT Application No. PCT/EP2008/0001510, dated May 29, 2008, 11 pages.
PCT International Search Report and the Written Opinion of the International Searching Authority, for PCT Application No. PCT/EP2008/0008437, dated Sep. 8, 2008, 16 pages.
PCT International Search Report and the Written Opinion of the International Searching Authority, for PCT Application No. PCT/EP2009/0051081, dated Sep. 8, 2008, 16 pages.
PCT International Search Report and the Written Opinion of the International Searching Authority, for PCT Application No. PCT/IB2007/0003724, dated Aug. 28, 2008, 7 pages.
PCT International Search Report and the Written Opinion of the International Searching Authority, for PCT Application No. PCT/US2006/0021393, dated Mar. 29, 2007, 6 pages.
PCT International Search Report and the Written Opinion of the International Searching Authority, for PCT Application No. PCT/US2006/0060392, dated Sep. 19, 2006, 5 pages.
PCT International Search Report and the Written Opinion of the International Searching Authority, for PCT Application No. PCT/US2007/0075564, dated Oct. 29, 2008, 12 pages.
PCT International Search Report and the Written Opinion of the International Searching Authority, for PCT Application No. PCT/US2008/0055864, dated Jul. 30, 2008, 6 pages.
PCT International Search Report and the Written Opinion of the International Searching Authority, for PCT Application No. PCT/US2008/0055964, dated Jul. 30, 2008, 6 pages.
PCT International Search Report and Written Opinion of the International Searching Authority for PCT Application No. PCT/EP2004/008706, dated Nov. 19, 2004, 13 pages.
PCT International Search Report and Written Opinion of the International Searching Authority for PCT Application No. PCT/EP2005/005033, dated Aug. 4, 2005, 13 pages.
PCT International Search Report and Written Opinion of the International Searching Authority, or the Declaration, for PCT Application No, PCT/US2006/021393, filed Jun. 2, 2006, paper dated Mar. 29, 2007, 12 pgs.
PCT International Search Report and Written Opinion of the International Searching Authority, or the Declaration, for PCT Application No. PCT/US2006/060392, filed Oct. 31, 2006, paper dated Sep. 19, 2008, 9 pgs.
PCT Invitation to Pay Additional Fees and, Where Applicable Protest Fee, for PCT Application No. PCT/EP2008/001578, paper dated Jul. 8, 2008, 5 pages.
PCT Invitation to Pay Additional Fees and, Where Applicable, Protest Fee, for PCT Application No. PCT/EP2010/059228, dated Aug. 12, 2010, 6 pages.
PCT Invitation to Pay Additional Fees for PCT Application No. PCT/EP2006/003999, dated Oct. 10, 2006, 5 pages.
PCT Notification Concerning Transmittal of International Preliminary Report on Patentability, for PCT Application No. PCT/US2007/062090, dated Aug. 28, 2008, 6 pages.
PCT Notification of Transmittal of the International Search Report and the Written Opinion of the International Searching Authority, or the Declaration for PCT Application No. PCT/EP2006/003999, dated Jan. 30, 2007, 19 pages.
PCT Notification of Transmittal of the International Search Report and the Written Opinion of the International Searching Authority, or the Declaration, for PCT Application No. PCT/EP2006/008358, Dec. 5, 2006, 14 pages.
PCT Notification of Transmittal of the International Search Report and the Written Opinion of the International Searching Authority, or the Declaration, for PCT Application No. PCT/EP2007/005330, filed Jun. 18, 2007, paper dated Sep. 28, 2007, 11 pages.
PCT Notification of Transmittal of the International Search Report and the Written Opinion of the International Searching Authority, or the Declaration, for PCT Application No. PCT/EP2007/006540, Nov. 8, 2007. 11 pgs.
PCT Notification of Transmittal of the International Search Report and the Written Opinion of the International Searching Authority, or the Declaration, for PCT Application No. PCT/EP2007/009763, paper dated Jun. 17, 2008, 11 pages.
PCT Notification of Transmittal of the International Search Report and the Written Opinion of the International Searching Authority, or the Declaration, for PCT Application No. PCT/EP2008/001510, dated May 29, 2008, 13 pages.

PCT Notification of Transmittal of the International Search Report and the Written Opinion of the International Searching Authority, or the Declaration, for PCT Application No. PCT/EP2008/052329, dated Sep. 15, 2008, 12 pages.

PCT Notification of Transmittal of the International Search Report and the Written Opinion of the International Searching Authority, or the Declaration, for PCT Application No. PCT/EP2009/005461, dated Apr. 20, 2010, 12 pages.

PCT Notification of Transmittal of the International Search Report and the Written Opinion of the International Searching Authority, or the Declaration, for PCT Application No. PCT/EP2009/005809, dated Nov. 24, 2009, 12 pages.

PCT Notification of Transmittal of the International Search Report and the Written Opinion of the International Searching Authority, or the Declaration, for PCT Application No. PCT/EP2009/006361, dated Nov. 11, 2009, 10 pages.

PCT Notification of Transmittal of the International Search Report and the Written Opinion of the International Searching Authority, or the Declaration, for PCT Application No. PCT/IB2007/003724, dated Aug. 28, 2008, 9 pages.

PCT Notification of Transmittal of the International Search Report and the Written Opinion of the International Searching Authority, or the Declaration for PCT Application No. PCT/US07/62090 issued Mar. 10, 2008, 10 pages.

PCT Notification of Transmittal of the International Search Report and the Written Opinion of the International Searching Authority, or the Declaration for PCT Application No. PCT/US2006/032959, dated Mar. 6, 2007, 8 pages.

PCT Notification of Transmittal of the International Search Report and the Written Opinion of the International Searching Authority, or the Declaration for PCT application no. PCT/US2007/075564, dated Jan. 30, 2008, 11 pages.

PCT Notification of Transmittal of the International Search Report and the Written Opinion of the International Searching Authority, or the Declaration, for PCT Application No. PCT/US2008/055964, paper dated Jul. 30, 2008, 8 Pages.

PCT Notification of Transmittal of the International Search Report and the Written Opinion of the International Searching Authority, or the Declaration, for PCT Application No. PCT/US2008/067746, dated Sep. 10, 2008, 8 pages.

PCT Notification of Transmittal of the International Search Report and the Written Opinion of the International Searching Authority, or the Declaration for PCT/EP/2005/011010, dated Jan. 23, 2006, 14 pages.

PCT Notification of Transmittal of the International Search Report and the Written Opinion of the International Searching Authority, or the Declaration for PCT/Ep/2005/05907, dated Aug. 1, 2005, 12 pages.

PCT Notification of Transmittal of the International Search Report and the Written Opinion of the International Searching Authority, or the Declaration, for PCT/EP2004/010199, paper dated Dec. 13, 2004, 13 pages.

PCT Notification of Transmittal of the International Search Report and the Written Opinion of the International Searching Authority, or the Declaration (PCT/EP2006/008342), dated Dec. 28, 2006.

PCT Notification of Transmittal of the International Search Report and Written Opinion of the International Searching Authority for PCT Application No. PCT/EP2005/001171, dated Jan. 27, 2006, 11 pages PCT Partial International Search Report for Application No. PCT/EP2009/051081, dated Apr. 29, 2009, 7 pages.

PIMA 15740:2000: Photography—Electronic Still Picture Imaging—Picture Transfer Protocol (PTP) for Digital Still Photography Devices, Photographic and Imaging Manufacturings Association, Approved Jul. 5, 2000, First Edition.

Plotnikov, Yuri et al., "Advanced Image Processing for Defect Visualization in Infrared Thermography, http://citeseer.ist.psu.edu/plotnikov98advanced.html", NASA Langley Research Center, M.S. Posted: ACM Portal, 1998.

Plotnikov, Yuri et al., Winfree, "Visualization of Subsurface Defects in Composites Using a Focal Plane Array Infrared Camera, http://citeseer.ist.psu.edu/357066.html", NASA Langley Research Center, 1999.

PTP: enabling seamless image transfer between devices. Overview of ISO 15740: 2005—Picture Transfer Protocol (PTP), http://www.i3a.org/pdf/i3a_ptp_factsheet.pdf.

Research-lab, "Better Wave to Text", Dec. 30, 2004, "http://www.research-lab.com/vexp007read.htm".

Romdhani, S. et al., "Face Identification by Fitting a 3D Morphable Model using linear Shape and Texture Error Functions, XP003018283", European Conference on Computer Vision, 2002, pp. 1-15.

Roux, Sebastien et al., "Embedded Convolutional Face Finder,Multimedia and Expo, XP031032828, ISBN: 978-1-4244-0366-0", IEEE International Conference on IEEE, 2006, pp. 285-288.

Rowley, Henry A. et al., "Neural network-based face detection, ISSN: 0162-8828, DOI: 10.1109/34.655647, Posted online: Aug. 6, 2002. http://ieeexplore.ieee.org/xpl/freeabs_all.jsp?arnumber-655647andisnumber-14286", IEEE Transactions on Pattern Analysis and Machine Intelligence, 1998, pp. 23-38, p. 92, vol. 20—Issue 1.

Ryu, Hanjin et al., "Coarse-to-Fine Classification for Image-Based Face Detection", Image and video retrieval lecture notes in Computer science, 2006, pp. 291-299, vol. 4071, Springer-Verlag.

Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

Sharma, G. et al., "Digital color imaging, [Online]. Available: citeseer.ist.psu.edu/sharma97digital.html", IEEE Transactions on Image Processing, 1997, pp. 901-932, vol. 6—Issue 7.

Shen, Jianhong, "Inpainting and the Fundamental Problem of Image Processing", 2002, 6 pages.

Shock, D. et al., "Comparison of Rural Remote Site Production of Digital Images Employing a film Digitizer or a Computed Radiography (CR) System, Abstract printed from http://csdl.computer.org/comp/proceedings/imac/1995/7560/00/75600071abs.htm", 4th International Conference on Image Management and Communication ( IMAC '95), 1995.

Sim, T. et al., "The CMU Pose, Illumination, and Expression (PIE) database, Automatic Face and Gesture Recognition", Fifth IEEE Intl. Conf, IEEE Piscataway, NJ, USA, 2002, 6 pages.

Sim, T. et al., "The CMU Pose, Illumination, and Expression (PIE) Database of Human Faces Robotics Institute, Tech. Report, CMU-RI-TR-01-02", 2001, 18 pgs, Carnegie Mellon University.

Skocaj, Danijel, "Range Image Acquisition of Objects with Non-Uniform Albedo Using Structured Light Range Sensor, Abstract printed from http://csdl.computer.org/comp/proceedings/icpr/2000/0750/01/07501778abs.htm", International Conference on Pattern Recognition (ICPR '00), 2000, vol. 1.

Smeraldi, F. et al., "Facial feature detection by saccadic exploration of the Gabor decomposition, XP010586874", Image Processing, ICIP 98. Proceedings International Conference On Chicago, IL, USA, IEEE Comput. Soc, 1998, pp. 163-167, vol. 3.

Smolka, B. et al., "Towards Automatic Redeye Effect Removal, XP004416063", Pattern Recognition Letters, 2003, pp. 1767-1785, vol. 24—Issue 11, North-Holland Publ.

Song, Hong et al., "Face detection and segmentation for video surveillance Language: Chinese. http://rlinks2.dialog.com/NASApp/ChannelWEB/DialogProServlet?ChName=engineering", Binggong Xuebao/Acta Armamentarii, 2006, pp. 252-257, vol. 27—Issue 2.

Soriano, M. et al., "Making Saturated Facial Images Useful Again, XP002325961, ISSN: 0277-786X", Proceedings of the SPIE, 1999, pp. 113-121, vol. 3826.

Stegmann, M.B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.

Stegmann, M.B. et al., "Multi-band modelling of appearance, XP009104697", Image and Vision Computing, 2003, pp. 61-67, vol. 21—Issue 1.

Stricker et al., "Similarity of color images", SPIE Proc, 1995, pp. 1-12, vol. 2420.

Sublett, J.W. et al., "Design and Implementation of a Digital Teleultrasound System for Real-Time Remote Diagnosis, Abstract printed from http://csdl.computer.org/comp/proceedings/cbms/1995/7117/00/71170292abs.htm", Eight Annual IEEE Symposium on Computer-Based Medical Systems (CBMS '95), 1995.

Tan, Yap-peng et al., "Robust Sequential Approach for the Detection of Defective Pixels in an Image Sensor, http://ieeexplorejeee.org/search/freesrchabstract.jsp?arnumber=758382&isnumber=16342&punumber=6110&k2d ock ey=758382@ieeecnfs&query=%28%28%28%28images+and+defects+and+correction%29%29%29%29+%3Cin%3E", IEEE International Conference on Acoustics, Speech, and Signal Processing, 1999, pp. 2239-2242, vol. 4.

Tang, Yuan Y. et al., "Information Acquisition and Storage of Forms in Document Processing, Abstract printed from http://csdl.computer.org/comp/proceedings/icdar/1997/7898/00/78980170abs.htm", 4th International Conference Document Analysis and Recognition, 1997, vol. I and II.

Tatsutoshi Kitajima (JP04-192681 English Translation; Electronic Camera, Jul. 10, 1992).

The PrismIQ Media Adapter (www.prismiq.com).

Tjahyadi et al., "Application of the DCT Energy Histogram for Face Recognition", Proceedings of the 2nd International Conference on Information Technology for Application, 2004, pp. 305-310.

Tkalcic, M. et al., "Colour spaces perceptual, historical and applicational background, ISBN: 0-7803-7763-X", IEEE, EUROCON, 2003, pp. 304- 308, vol. 1.

Toet, a., "Multiscale Color Image Enhancement, International Conference on Image Processing and its Applications, 1992, pp. 583-585, Posted online: 200208-06 18:09:24.0 http://ieeexplore.ieee.org/search/freesrchabstract.jsp?arnumber=146865&isnumber=3917&punumber=1197&k2dockey =146865@ieeecnfs&query=%28%28images+and+defects+andHluminance%29%29+%3Cin%3E-Fmetadata&pos=1", .

Toshiba, libretto U100, Apr. 22, 2005, Toshiba America Information Systems Inc., Rev. 1.02.

Translation of Hiroshi et al. JP05-224271, Mar. 1993, Japan Publication.

Turk, Matthew et al., "Eigenfaces for Recognition", Journal of Cognitive Neuroscience, 1991, 17 pgs, vol. 3—Issue 1.

Turkan, Mehmet et al., "Human face detection in video using edge projections, Conference: Visual Information Processing XV, http://rlinks2.dialog.com/NASApp/ChannelWEB/DialogProServlet?ChName=engineering", Proceedings of SPIE—The International Society for Optical Engineering Visual Information Processing, 2006, vol. 6246.

Twins Crack Face Recognition Puzzle, Internet article http://www.cnn.com/2003/TECH/ptech/03/10/israel.twins.reut/index.html, printed Mar. 10, 2003, 3 pages.

United Kingdom Search Report dated May 22, 2007, issued in Application No. GB 0701957.3.

UPNP Forum http://www.upnp.org.

UPnP Standards, Internet printout Jan. 1, 2007, http://www.upnp.org/standardizeddcps/default.asp, 1 page.

U.S. Appl. No. 10/170,511, filed Jun. 12, 2002, inventor Michael J. DeLuca.

U.S. Appl. No. 10/608,772, entitled "Method of improving orientation and color balance of digital images using face detection information".

U.S. Appl. No. 10/772,767, filed Feb. 4, 2004, by inventors Michael J. DeLuca, et al.

U.S. Appl. No. 11/217,788, filed Aug. 30, 2005, inventors Eran Steinberg, et al.

U.S. Appl. No. 11/554,539, filed Oct. 30, 2006, entitled Digital Image Processing Using Face Detection and Skin Tone Information.

USB Device Working Group, "USB Still Image Capture Device Definition", Revision 1.0, Jul. 11, 2000, http://www.usb.org/developers/devclass_docs/usb_still_img10. pdf.

Viola Paul, et al., "Robust Real-time Object Detection", Second International Workshop on Statistical and Computation Theories of Vision—Modeling, Learning, Computing, and Sampling, Vancouver, Canada, Jul. 13, 2001, 25 Pages.

Viola, P. et al., "Rapid Object Detection using a Boosted Cascade of Simple Features", Proceedings of the 2001 IEEE Computer Society Conference on Computer Vision and Pattern Recognition, 2001, pp. I-511-I-518, vol. 1.

Viola, P. et al., "Robust Real-Time Face Detection", International Journal of Computer Vision, 2004, pp. 137-154, vol. 57—Issue 2, Kluwer Academic Publishers.

Vuylsteke, P. et al., "Range Image Acquisition with a Single Binary-Encoded Light Pattern, abstract printed from http://csdl.computer.org/comp/trans/tp/1990/02/i0148abs.htm", IEEE Transactions on Pattern Analysis and Machine Intelligence, 1990, 1 page.

Wan, S.J. et al., "Variance-based color image quantization for frame buffer display", S. K. M. Wong Color Research & Application, 1990, pp. 52-58, vol. 15—Issue 1.

White Paper of CIPA DC-005-2005, "'Picture Transfer Protocol' over TCP/IP networks", Standard of the Camera & Imaging Products Association, published by Camera & Imaging Products Association, Nov. 8, 2005, 6 pages.

Willamowski, J. et al., "Probabilistic Automatic Red Eye Detection and Correction", The 18th International Conference on Pattern Recognition (ICPR'06), 2006, pp. 762-765, vol. 3, IEEE Computer Society.

Xin He et al., "Real-Time Human Face Detection in Color Image", International Conference on Machine Learning and Cybernetics, 2003, pp. 2915-2920, vol. 5.

Yang M.H., Ahuja N., "Detecting Human Faces in Color Images," 1998, Beckman Institute, 127-130.

Yang, Ming Hsuan et al., "Face Detection and Gesture Recognition for Human-Computer Interaction", 2004, p. 33-p. 35, Kluwer Academic.

Yang, Ming-Hsuan et al., "Detecting Faces in Images: A Survey, ISSN:0162-8828, http://portal.acm.org/citation.cfm?id=505621&coll=GUIDE&d1=GUIDE&CFID=680-9268& CFTOKEN=82843223.", IEEE Transactions on Pattern Analysis and Machine Intelligence archive, 2002, pp. 34-58, vol. 24—Issue 1, IEEE Computer Society.

Yao, Christina: "Image Cosmetics: An automatic Skin Exfoliation Framework on Static Images" UCSB Four Eyes LabImaging, Interaction , and Innovative Interfaces Publications Thesis, Master of Science in Media Arts and Technology Dec. 2005, pp. 1-83, Retrieved from the Internet : URL: http ://ilab cs.ucsb.edu/publications/YaoMS.pdf >.

Zhang, Jun et al., "Face Recognition: Eigenface, Elastic Matching, and Neural Nets", Proceedings of the IEEE, 1997, pp. 1423-1435, vol. 85—Issue 9.

Zhao, W. et al., "Face recognition: A literature survey, Issn: 0360-0300, http://portal.acm.org/citation.cfm?id=954342&coll=GUIDE& d1=GUIDE&CFID=680-9268& CFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

\* cited by examiner

| Field | Size [Bytes] | Data Type |
|---|---|---|
| Protocol GUID | 16 | UINT8 |
| Packet Type | 2 | UINT16 |
| Payload | ? | ? |

Figure 4

| Field | Size [Bytes] | Data Type |
|---|---|---|
| Protocol GUID | 16 | UINT8 |
| Packet Type | 2 | UINT16 |
| Device GUID | 16 | UINT8 |
| Device Friendly Name | 2..80 | UINT16 |
| Reserved Data | 0 or more | UINT8 |

Figure 5

| Field | Size [Bytes] | Data Type |
|---|---|---|
| Protocol GUID | 16 | UINT8 |
| Packet Type | 2 | UINT16 |
| Own Device GUID | 16 | UINT8 |
| Received Device GUID | 16 | UINT8 |

Figure 6

METHOD FOR ESTABLISHING A PAIRED CONNECTION BETWEEN MEDIA DEVICES

RELATED APPLICATIONS

This application is a Continuation of U.S. patent application Ser. No. 11/294,628, filed Dec. 2, 2005, now U.S. Pat. No. 7,792,970, which is a Continuation in Part (CIP) of U.S. patent application Ser. No. 11/156,234, filed Jun. 17, 2005, now U.S. Pat. No. 7,506,057, which is related to a contemporaneously filed application having Ser. No. 11/156,235, now U.S. Pat. No. 7,747,596, and each is hereby incorporated by reference.

FIELD OF THE INVENTION

The invention relates to the field of networked appliances, particularly to networked digital cameras and support appliances for analysis, management, post-processing, sorting, storage and printing of digital images, metadata and audio data associated with said images.

BACKGROUND OF THE INVENTION

Recently, communication protocols have developed for allowing a computing device to control and communicate with media devices such as digital cameras. One such protocol, ISO 157540 Picture Transfer Protocol (PTP), incorporated into products of the Microsoft Corporation of Redmond, Wash., can be used in connection with transferring images from imaging devices, such as cameras, to personal computing devices. This protocol defines how the digital still camera can communicate with a personal computing device.

Referring to FIG. 1, the PTP protocol is an asymmetric control and data transfer protocol, somewhat like a master/slave protocol. However, in PTP parlance one refers to the devices engaged in a picture transfer as the Initiator 310 and Responder 230, rather than the Master and Slave. The Initiator 310 device establishes and subsequently manages a control connection while the Responder is defined as the device that responds to operation requests such as an "OpenSession" request.

Devices, in the PTP protocol model, can be Initiators, Responders, or both. For instance, a PC may be configured only as an Initiator device while a USB camera may be only a Responder. Similarly, a wireless camera, that opens a connection to a wireless PTP printer and pushes pictures for print, may be only an Initiator while the corresponding printer may be only a Responder. It is recognized by the inventors of the present invention that a digital camera that can connect to other digital cameras and is able to both initiate and receive a PTP session will have to be capable of behaving both as Initiator and Responder.

Usually, the Initiator will have a form of graphical user interface application 240 so that a user can see/browse thumbnails, select and chose an appropriate control action, and so on. The Initiator device implements the device enumeration and transport mapping (in the case that multiple, PTP-compliant transports are supported) in a transport specific manner. Typically, a Responder will not have a graphical user interface or multiple transport support.

In order for two PTP devices to exchange information about pictures or metadata, a PTP session may be established. A session is a logical connection between PTP devices, over which object identifiers, or ObjectHandles, and storage media identifiers, or StorageIDs, are persistent. A session is considered open after the Responder returns a valid response to an OpenSession operation requested by the Initiator. A session is closed after a CloseSession operation is completed or the transport closes the communication channel, whichever occurs first.

The only operation or data traffic allowed outside the session is a GetDeviceInfo operation and a DeviceInfo dataset. A device can issue/accept a GetDeviceInfo operation outside a session. A session may be utilized to transfer descriptors (e.g., StorageInfo, ObjectInfo), images or other objects between devices. Any data communicated between devices is considered valid unless a specific event occurs specifying otherwise.

PTP is actually a transport independent protocol. In its original embodiment it was designed and intended for use over a Universal Serial Bus (USB) transport—"legacy PTP". Alternative transports can be implemented over local area networks. Examples include PTP over Bluetooth and PTP over IP networks 210 (PTP/IP) as illustrated in FIG. 1.

As described in the CIPA-DC-005-2005 PTP-IP Standard which can be found at http://www.cipa.jp, hereby incorporated by reference, a PTP/IP device is uniquely recognized using a unique device identifier called GUID. Two PTP/IP devices can communicate with each other if their GUIDs are known to each other. In this way, application software running on such devices can implement restriction connection policies. Both the Initiator and Responder can maintain a list of GUIDs for devices to which they may connect.

There are multiple ways that the GUIDs of peer devices can be exchanged, e.g., storage media based methods or networking based methods.

Referring to FIG. 1, In PTP/IP, communication between two image devices happens via two TCP connections (logical data channels) 211,212. The first connection 211 is dedicated to Operation Request, Response and Data transaction packets as well as to carry PTP/IP specific packets (i.e. Command/Data Connection). The second TCP connection 212 should be used exclusively for Event transaction packets (i.e., Event Connection). Event packets are transported separately from Operation and Data transaction packets because of their asynchronous nature.

Each of the Command/Data TCP and the Event connection are established by the image Initiator device and identified by the local and remote IP addresses and port numbers. The Responder's IP address and port number are provided through the device discovery mechanism or manually configured using a user interface on the Initiator device.

Further details are given in (i) "Digital camera connectivity solutions using the picture transfer protocol (PTP)" to Bigioi, P.; Susanu, G.; Corcoran, P.; Mocanu, I and published in IEEE Transactions on Consumer Electronics, volume 48, issue 3, p 417-427, August 2002; and (ii) PTP ("Picture Transfer Protocol" which is an international standard ISO-15740 PTP Specification (see http://www.i3a.org/downloads_it10.html), which are hereby incorporated by reference.

Note that reference (i) above also includes a detailed description of a PTP/Bluetooth transport.

The PictBridge Standard (CIPA DC-001) from the Camera & Imaging Products Association (CIPA), and published in early 2003, provides for direct connection between image input devices, such as digital cameras, and image output devices, such as printers. It achieves this by standardizing the applications services for these devices. In particular it focuses on the provision of direct print services from a camera to a printer, without the need for a USB master device such as a desktop PC.

CIPA DC-001 takes advantage of the commonality of digital camera interfaces and data storage formats to provide an effective solution for connectivity between a single camera and a single printer. Key services offered by DC-001 compliant devices include: (i) direct printing one or more selected images on the camera UI; (ii) support for "Direct Print Ordering Format" (DPOF) based print services; (iii) index print of all images in camera; (iv) display of printer status information on the camera UI; (v) print job control functions—cancel, pause, restart and (vi) additional features which require advanced print setup, such as multiple print copies, image crop prior to print, specify image print size, etc.

CIPA DC-001 uses PTP to provide low-level functions and services which are used to support the higher-level functionality of PictBridge.

Most digital photography devices on the market today support legacy PTP in order to allow interconnection of media devices such as cameras and printers without the need for an intermediate desktop PC. Printers which are designed for digital photography will also support PictBridge which allows a PTP camera to directly select and print images. The physical link for such PTP enabled devices is usually a wired connection between the PTP/Pictbridge devices and this is typically a USB connection.

Wireless printers are already available in the market and next-generation cameras and printers will support connection over wireless networks using PTP/IP. This will provide users with a greatly enhanced experience creating photographic prints without physically connecting a camera to a printer.

Unfortunately the owners of legacy PTP devices will be unable to benefit because legacy cameras and printers do not (i) provide a physical network connection, (ii) their legacy PTP software does not support or understand TCP/IP networking and/or (iii) no support is provided in the PTP protocol for device discovery, nor for supporting the presence of multiple devices as would typically exist on a TCP/IP network.

SUMMARY OF THE INVENTION

A method is provided for establishing a paired connection across a network between first and second media devices including a digital camera device. Responsive to user interaction with the first media device, a first information message including an identifier is transmitted across the network with a request to pair the first media device with the second media device. An identifier of the second device is retrieved from the second information message in response to receipt of the second information message from the second device within a first predetermined time period. A confirmation message including an identifier of the first device and an identifier of the second device is transmitted across the network. In response to receipt of a corresponding confirmation message from the second device within a second predetermined time period, a paired connection is completed. The method also includes initiating image transfer from the digital camera device to a remote storage device that cooperates with the camera device via a camera adapter, and preferably a PTP camera adapter.

One or more of the information and confirmation messages may be transmitted via User Datagram Protocol.

The first media device may be responsive to receipt of an information message from a third media device, different from said second media device, upon failing to establish a paired connection with the second device during the first or second predetermined time periods.

Further paired connections may be established with further media devices.

The information and confirmation messages may include a protocol identifier.

The communicating may be according to the Picture Transfer Protocol (PTP).

The connection between the first and second media devices preferably employs a communications protocol which permits the first device to control the second device in providing a media acquisition, filtering and/or output service.

A media device is also provided for handling media and establishing a paired connection with a second media device across a network. The media device includes a media device housing containing a media handling component architecture, a network interface coupled with the component architecture, and a pairing actuator. The media device comprises a digital camera device and is configured to cooperate with a remote storage device via a camera adapter, preferably a PTP camera adapter, to initiate image transfer from the camera device to the storage device.

The pairing actuator is signal-coupled with the network interface such that, upon user interaction with the pairing actuator, transmission of an information message is initiated through the network interface. The information message includes an identifier and a request to pair the media device with a second media device.

Responsive to receipt of an information message through the network interface from the second media device within a first predetermined time period, the first media device retrieves an identifier of the second device from the information message and transmits a confirmation message through the network interface including identifiers of the first and second devices. Responsive to receipt of a corresponding confirmation message through the network interface from the second media device within a second predetermined time period, a paired connection is completed. The connection preferably employs a communications protocol which permits the first device to control the second device in providing a media acquisition, filtering and/or output service.

A digital image acquisition and storage system is also provided including a digital camera device, a camera adapter, preferably a PTP camera adapter, and a remote storage device. The remote storage device cooperates with the camera device via the camera adapter to initiate image transfer from the camera to the storage device.

A system of devices is further provided including a digital camera adapter device and a storage device, wherein said adapter device is arranged to connect to a camera via a bus interface. The adapter device is arranged to connect to the storage device via the network interface. The storage device is preferably arranged to send a request periodically via the adapter device to the camera to determine whether a backup of data stored on the camera may be performed and to monitor for a response.

The adapter device may be responsive to receipt of a response to send a request for data to the camera and to receive and store the data for later retrieval by the storage device. The request may include a request for data to be transferred.

The adapter device may be arranged to query the storage device to determine whether a memory of the storage device is full.

The storage device may be arranged to mark data not to be deleted from the storage device. The storage device may be arranged to provide the camera with information about data stored in said storage device.

A backup system is also provided including an adapter device and a storage device. The adapter device is arranged to connect to a camera via a bus interface and arranged to connect to the storage device via a network interface, thereby enabling messages to be transmitted between the storage device and a camera. The storage device may be arranged to initiate data transfer from the camera to the storage device via the adapter device.

A digital camera adapter device is also provided for establishing a paired connection with a second device across a network. The adapter device includes a user actuator, a network interface and a bus interface. The adapter device is arranged on establishment of the paired connection to transmit messages between the bus interface and the network interface. The adapter device is responsive to user interaction with the user actuator, to transmit an information message through the network interface, wherein the information message includes an identifier indicating that the user of the device wishes to pair the device with the second device. Responsive to receipt of an information message through the network interface from the second device within a first predetermined time period, the adapter device retrieves an identifier of the second device from the information message and transmits a confirmation message through the network interface including an identifier of the device and an identifier of the second device. Responsive to receipt of a corresponding confirmation message through the network interface from the second device within a second predetermined time period, the adapter device completes a paired connection with the second device.

A system including the adapter device and a storage device is further provided. The adapter device is arranged to connect to a camera via the bus interface, and the adapter device is arranged to connect to the storage device via the network interface. The storage device is preferably arranged to send a request periodically via the adapter device to the camera to determine whether a backup of data stored on the camera may be performed and to monitor for a response.

BRIEF DESCRIPTION OF THE DRAWINGS

Preferred and alternative embodiments will now be described by way of example, with reference to the accompanying drawings, in which:

FIG. 4 illustrates a general format of a packet used in the pairing sequence of FIG. 2;

FIG. 5 illustrates a DEVICE INFO Message format;

FIG. 6 illustrates a CONFIRMATION Message format;

DETAILED DESCRIPTION OF PREFERRED EMBODIMENTS

In preferred embodiments, a manual means of GUID exchange in order to allow further PTP/IP communication, also known as "device pairing", is provided. This exchange mechanism is particularly suited to usage scenarios for digital cameras and associated network printers. However, as may understood by those skilled in the art, alternative forms of exchange mechanisms may be used to support alternative embodiments.

Two particular device embodiments permit (i) a legacy PTP camera to be connected to a PTP/IP enabled PictBridge printer and (ii) a legacy PictBridge printer to allow connections to be created with PTP/IP enabled digital cameras.

As such, a device in accordance with a preferred embodiment provides TCP/IP network compatibility for legacy media devices such as PTP cameras and PictBridge printers. Advantageously, PictBridge functionality may be extended to a TCP/IP network by replacing the PTP/USB transport with PTP/IP, even when devices do not support a common physical TCP/IP network link.

Figure 1:
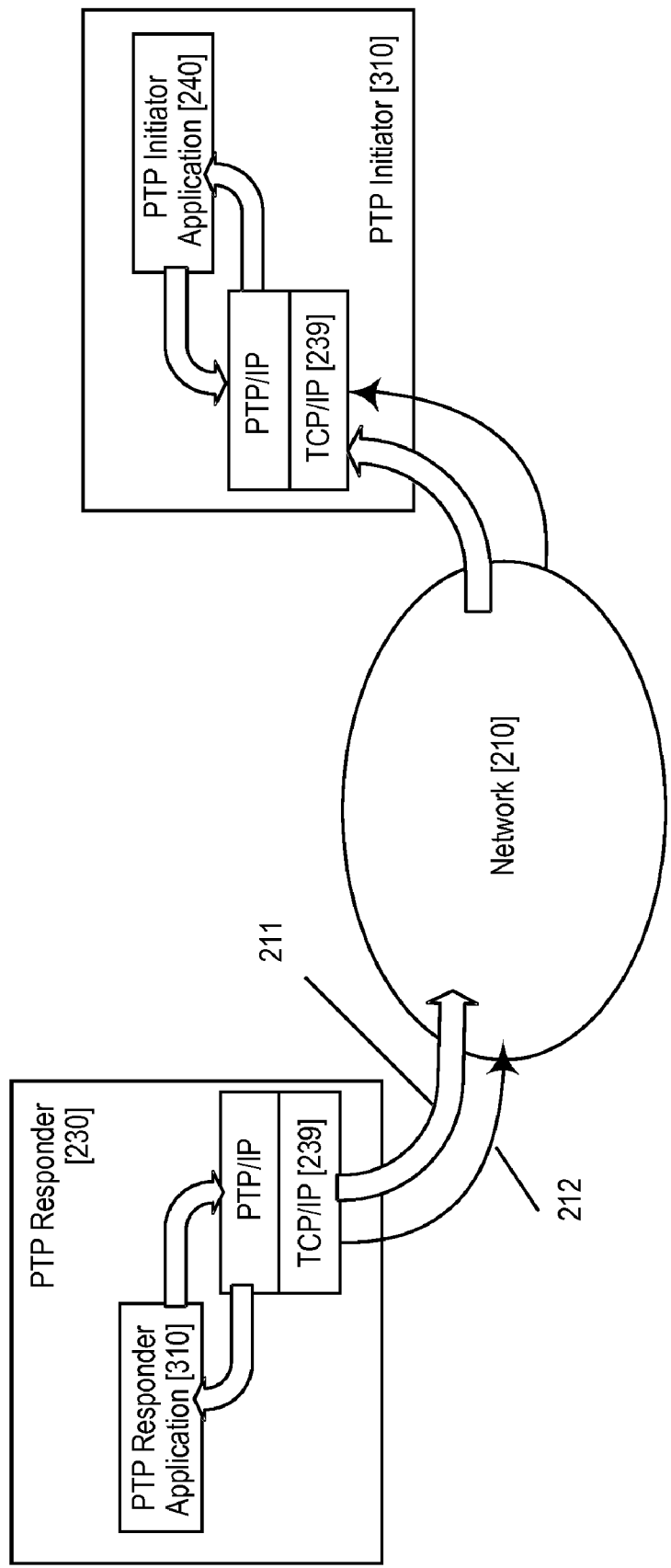
FIG. 1 illustrates operation of a conventional PTP/IP communication.
Figure 2:
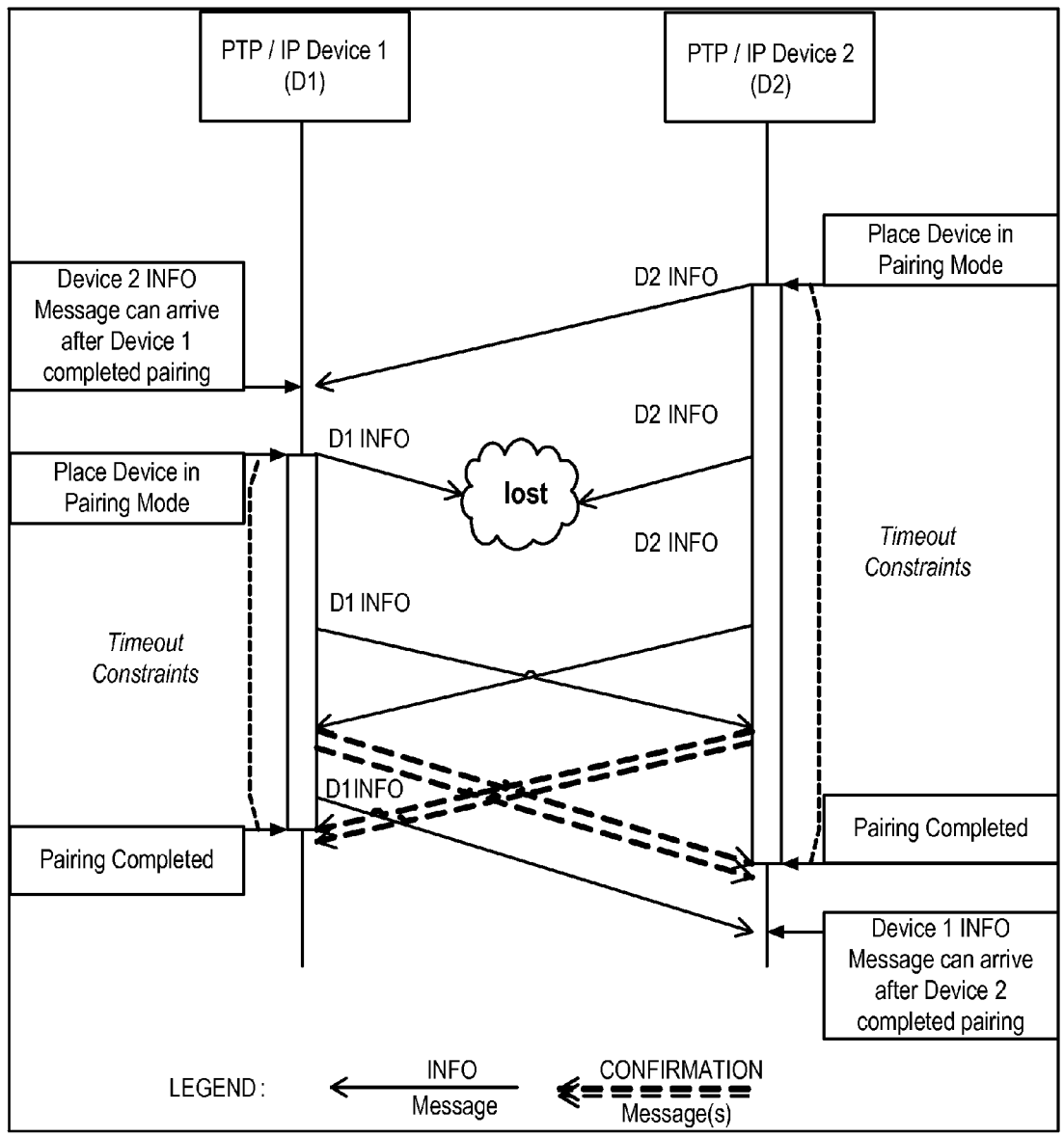
FIG. 2 illustrates a sequence of pairing two media devices according to a preferred embodiment.

Referring now to FIG. 2, devices D1 and D2 are preferably paired before PTP/IP communication across a network takes place. In accordance with a preferred embodiment, a protocol based on an exchange of messages contains pairing information (GUID and Friendly Name) between two devices placed in a pairing mode (or pairing state). In general, messages employed by the protocol are preferably as shown in FIG. 4. Each packet part of this protocol starts with a 16 byte field representing a GUID of the protocol—a value specially generated for this protocol. The GUID used by the PTP/IP pairing mechanism of the preferred embodiment is 0FDB8EFB-6968-4734-A0CF-48694382A3D7. This GUID is basically a protocol identifier for ensuring that the received UDP packets will not be wrongfully interpreted.

The protocol GUID field is followed by a type field having one of the following values (two byte field):

0x01—DEVICE INFO
0x02—CONFIRMATION

This in turn is followed by a payload which comprises a variable size content, differing according to the type of the packet.

Binary values in the packets are represented in the little endian format.

Preferably, a user causes a device to enter pairing mode by interaction with a suitable actuator. In a general purpose computing device running an application which communicates using PTP/IP, such actuation can include pressing a keyboard key or actuating a pointer switch. On less complex or more dedicated devices described later, however, actuation can be through a simple button. For simplicity, however, we will refer to these generally as the pairing actuator.

Preferably, the protocol is such that the chances that the pairing will be done successfully are larger if the pairing actuator on both devices which are to be connected is pressed at or about the same time.

In the preferred embodiment, when placed in pairing mode, the PTP/IP device sends out a series of DEVICE INFO messages and starts listening on UDP port 15740 for any Device INFO messages from remote devices.

When in pairing mode, the device sends one DEVICE INFO Message per second and the expiry time of pairing mode is set to 5 seconds.

FIG. 5 presents a preferred layout for a DEVICE INFO Packet:

Device GUID—is a device identifier (GUID)
Device Friendly Name—null-terminated UNICODE string that contains a human readable name for the remote device. The information in this field is generally used for application user interface purposes.
Reserved Data—0 or more bytes reserved for the expansion of the protocol. The maximum value is limited by the MTU (Maximum Transmission Unit) of the used underlying network. This can be used for manufacturer specific data of the sending device.

The DEVICE INFO message is sent multiple times, with a time interval between them, to compensate for the fact that the two devices involved in the pairing procedure need not be put in pairing mode at exactly the same moment in time. Preferably, DEVICE INFO messages are sent at the above interval until a CONFIRMATION message is received or until the expiry time.

Once a peer device receives a DEVICE INFO message, it will cache it and send out CONFIRMATION messages. Each CONFIRMATION message contains the information about both the originating and confirming device (GUIDs). To maximize the chances that the CONFIRMATION message will not be lost, it is preferred that a device send out three such messages at a time interval of 100 ms. Again CONFIRMATION messages are preferably uni-cast on port 15740 UDP. More specifically, they may have the format presented in FIG. 6, where:

Own Device GUID—is a device identifier (GUID)
Received Device GUID—is a device identifier (GUID) received via a DEVICE INFO message from the peer device.

Preferably, if a device involved in pairing receives DEVICE INFO messages from multiple devices when in pairing mode, it may fail the pairing procedure. Thus, the device preferably receives DEVICE INFO messages from only one peer device when in pairing mode to complete a successful pairing procedure. This is a practical limitation and it is based on an assumption that a user would usually wish to pair only two devices. Thus, receipt of more than one DEVICE INFO message would be indicative of an erroneous, insecure or undesirable operating environment. Likewise, a device should receive a CONFIRMATION message from no more than one peer device when in pairing mode for the same reason.

Figure 3:
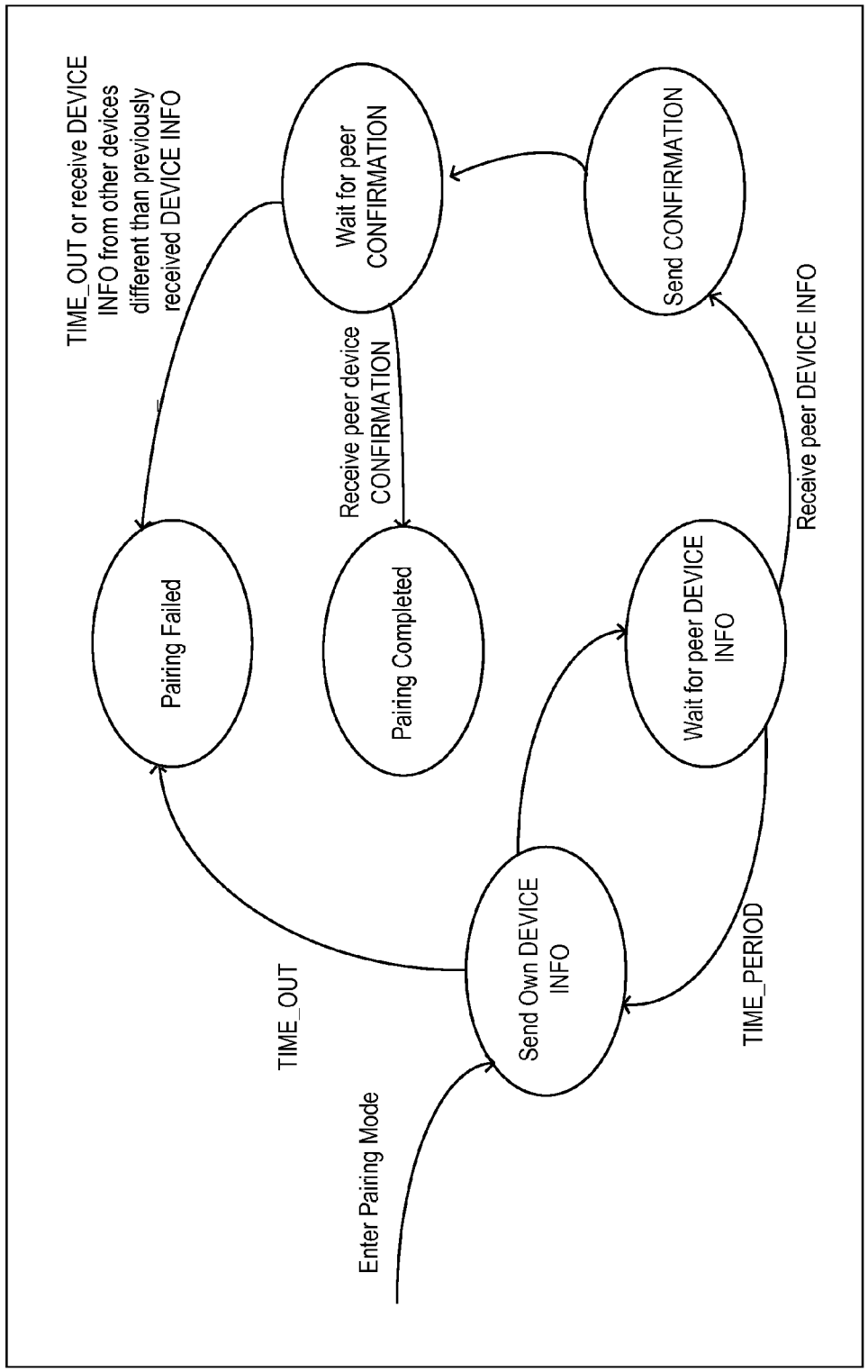
FIG. 3 illustrates a state diagram for the pairing sequence of FIG. 2.

The states that a PTP/IP device has to traverse in order to achieve a successful pairing are presented in FIG. 3.

As explained above, a device on entering pairing mode sends its own DEVICE INFO message and then waits for DEVICE INFO messages from peer pairing devices. Upon a defined time period (TIME_PERIOD), the device resends its own DEVICE INFO information. If upon a defined time out (TIME_OUT) period no peer DEVICE INFO is received, the device gives up and declares the pairing procedure failed.

If the device receives DEVICE INFO message from a peer device, then it sends its own CONFIRMATION message and waits for a peer CONFIRMATION message. Upon receipt of the peer device CONFIRMATION message matching the previous information received via peer DEVICE INFO message, the pairing session is completed successfully. If a CONFIRMATION message is not received upon the defined timeout (TIME_OUT) the pairing procedure is declared failed. If other DEVICE INFO messages are received from other devices than the one received initially, then the pairing procedure is declared failed. If other CONFIRMATION messages from other devices than the one received initially are received, then the pairing procedure is declared failed.

Nonetheless, it will be seen that once pairing has been completed between, e.g., a local device and a remote device, then in certain cases it can be possible to have the local device pair with one or more subsequent devices and to maintain connections to multiple remote devices in separate virtual sessions.

The features described herein in accordance with preferred and alternative embodiments find utility in many different types of devices where application software communicating through PTP/IP runs. These include, for example, general purpose computing devices, printers and digital image acquisition devices, e.g., digital cameras. These features can also be implemented in more dedicated devices such as hardware translators or indeed in software translators.

As explained above, there are two PTP transports already used in devices:

1) USB—which was the first adopted PTP transport and is currently widely supported in Digital Still Cameras and recently in PictBridge printers; and 2) PTP/IP—which is a relatively new transport and which will become available soon in some WiFi cameras.

Having adopted those transports, users will encounter the situation when it is desirable to have a "legacy" USB-PTP device communicate with a PTP/IP device.

In a particular embodiment, a translator may be used when it is either not possible or inconvenient to directly connect an Initiator to a Responder, e.g., because they are using different transports, i.e., hardware interfaces. An example would be where a USB Camera (PTP Responder) is to be connected to a PC (PTP Initiator) via WiFi.

In the context of the present specification, a PTP Translator is a device or a software module that indirectly connects a PTP Initiator with a PTP Responder, where Initiator and Responder usually (but not necessarily) use a different type of transport (e.g. USB, TCP/IP, etc.). The function of the translator is to repeat the PTP communication from one transport to another, as it would be if the Initiator and Responder were connected directly. A feature of such translators is that they don't fully implement PTP or application level protocols (i.e. PictBridge).

In general, there are at least two ways for such PTP translator to translate PTP communication traffic:

Acting as a gateway to perform translation, interpret PTP commands and also generate simple PTP protocol elements (i.e. implement OpenSession, CloseSession, etc.) to deal with multiple sessions on one side and single session on the other side (i.e. PTP Gateway). That means that the device should know the semantics of PTP commands, and in particular PTP commands used by the PictBridge protocol and being relayed by the translator. A disadvantage can be that it is difficult to implement a generic gateway, because a device may use vendor commands for which the semantics are not known. In general, a gateway can be vendor specific or alternatively allow just standard PTP commands (for which the semantics are defined).

Acting as a bridge to pass-through a PTP command from one end to another using a common translation procedure that converts the packets of one transport protocol to another transport protocol. An advantage is that a generic bridge can be opaque for a PTP device that maintains vendor features.

Some useful cases of translators, which will be described in more detail later, are as follows:

PTP Camera Adapter—Internal or external PTP/USB to PTP/IP device that network enables an existing USB digital camera. In particular, when implemented externally, the adapter can take the form of a dongle. The camera only runs PTP protocol over USB, while the PTP adapter acting as either a bridge or a gateway runs the communication protocols that make the camera a PTP network camera. One end of the adapter acts as a USB-Initiator and is connected to the camera, and another end is a PTP/IP-Responder and is connected to a PTP/IP Initiator.

PTP Printer Adapter—Internal or external PTP/IP to PTP/USB device that network enables an existing USB PictBridge™ Printer. Again, when implemented externally, the adapter can take the form of a dongle. The printer runs PictBridge™ over USB, while the PTP adapter, running as a gateway, has the communication protocols to make the printer look like a network PictBridge™ printer. In this case, one end of the adapter is a USB-Responder and is connected to the printer, and another end is a PTP/IP-Initiator and is connected for example across a WLAN to a WiFi camera. Such a translator allows a currently available standard PictBridge printer to talk with PTP/IP cameras that will soon appear on the market.

PTP PC Adapter—PTP/IP to PTP/USB Device that network enables an existing PC that works with standard USB PTP cameras. The PC runs a standard PTP/USB Initiator (i.e. Windows XP WIA or MAC OSX ICA), while the adapter acts as a standard PTP Responder every-time it detects a peer PTP/IP Responder, making it look to the PC as it would be directly attached via a USB cable.

PTP Camera Adapter

Figure 7A:
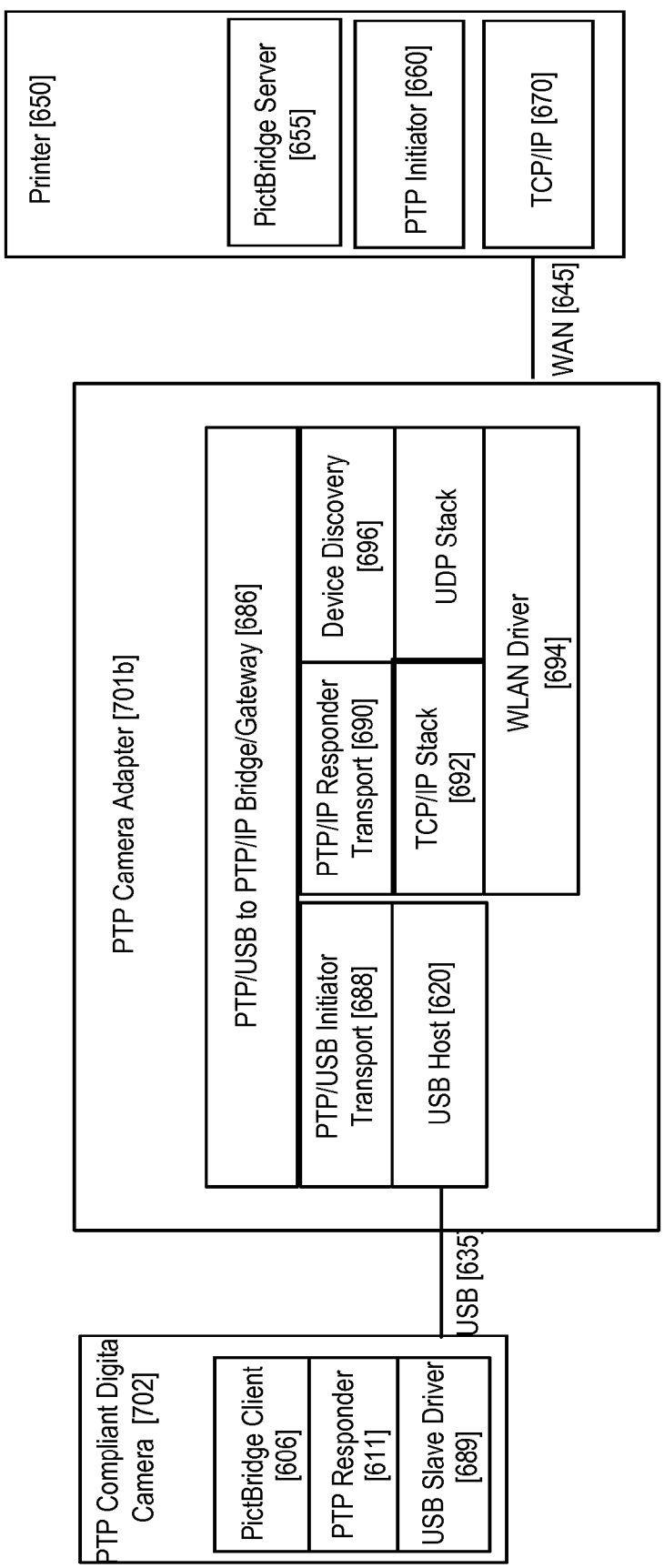
FIGS. 7(a) to 7(c) illustrate PTP adapters coupled between various combinations of media devices.

Referring now to FIG. 7(a), a convention PTP compliant digital camera 702 is connected via a USB connection 635 to a PTP Camera Adapter 701b according to a preferred embodiment. In this case, the camera PTP responder 690 communicates across a wireless LAN via a driver 694, although it will be seen that it can be arranged to communicate across any network—wired or wireless—using any required transport.

It should be noted that in a conventional PTP compliant camera, the PTP Responder 611 will in general not allow multiple PTP sessions—because a USB slave 689 was only connectable with one USB host 620 at a time.

However if the features of the PTP Camera Adapter are extended, then the adapter 701b can be used in at least two different scenarios:
  to allow the camera to implement PictBridge™ client; and/or
  to allow the camera to implement a PTP generic responder.

Where the camera implements a PictBridge™ client 606, then an adapter with a single PTP session is enough and a PTP Bridge 686 implementation within the adapter will suffice. The protocol for selecting the PTP device with which the camera communicates during this session is as described in relation to FIGS. 2 to 6 and is implemented within a device discovery layer 696 which is responsive to a user actuating a pairing actuator (not shown) on the adapter 702b and the printer 650 within the required time out period and without interference from other pairing devices.

Where the camera implements a PTP generic Responder, then it is natural for this Responder to work with multiple Initiators in the network. In order for the PTP Camera Adapter to support multiple PTP sessions, the adapter supports a feature called "Virtual Sessions". With Virtual Sessions the adapter serializes PTP traffic from multiple remote devices including PTP Initiators 660 to one USB slave 689. Each remote initiator is paired in sequence with the adapter as described with reference to FIGS. 3 to 6, so limiting the connections to the camera 702.

In relation to virtual sessions, a unit of serialization normally is a PTP Transaction. In most cases, the standard PTP commands are stateless—so allowing one PTP Transaction at a time will do for simple scenarios. However, in general there are standard as well as vendor commands that work in a specific sequence and are not stateless. In that case the adapter would utilizes further semantics of such commands and a more complex serialization of transactions, e.g., so that one Initiator 660 will not break an atomic command sequence of another Initiator. Additionally, some commands involve more actions than just passing-through: e.g. a DeleteObject command involves sending ObjectRemoved event for each Virtual Session than the current one. For this reason, a PTP Gateway 686 implementation is more appropriate for implementing Virtual Sessions and for ensuring an ordered processing of transactions between sessions for devices paired through the adapter.

In one implementation of the adapter, both Bridge and Gateway are implemented. Most of the time, the adapter works in Bridge mode (while only one session is active). If multiple Initiators want to work with the camera, then the adapter switches into PTP Gateway mode, allowing virtual multiple sessions.

PTP Printer Adapter (Dongle)

Figure 7B:
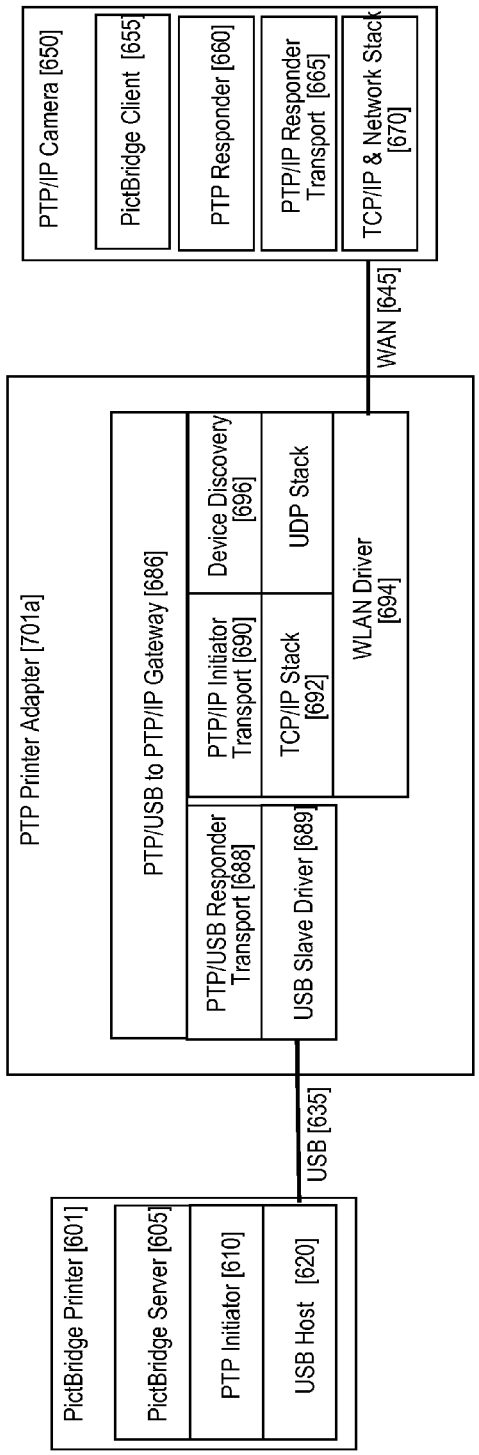

Referring now to the example illustrated at FIG. 7(b), the printer adapter 701a of this embodiment has two interfaces: a WIFI interface 694 and USB Slave interface 689. Its primary function is to transform a standard USB PictBridge™ printer 601 into a WIFI PictBridge™ printer, available on a wireless local area network 645. Such an adapter preferably connects only to PictBridge™ clients (PTP/IP Responders that advertise their application protocol to be PictBridge™, or their intent to print).

It will be seen that the adapter 701a can in practice only be implemented with a gateway layer 686 rather than with more basic bridge functionality. One reason is that the legacy printer side USB transport (unlike PTP/IP) does not carry enough self-descriptive information about the command being transported, so it does not allow the PTP Printer Adapter (or a PTP PC Adapter) to be implemented as a PTP Bridge. Another reason is that a PTP Bridge does not allow a virtual session approach to be implemented safely in all cases.

Figure 8:
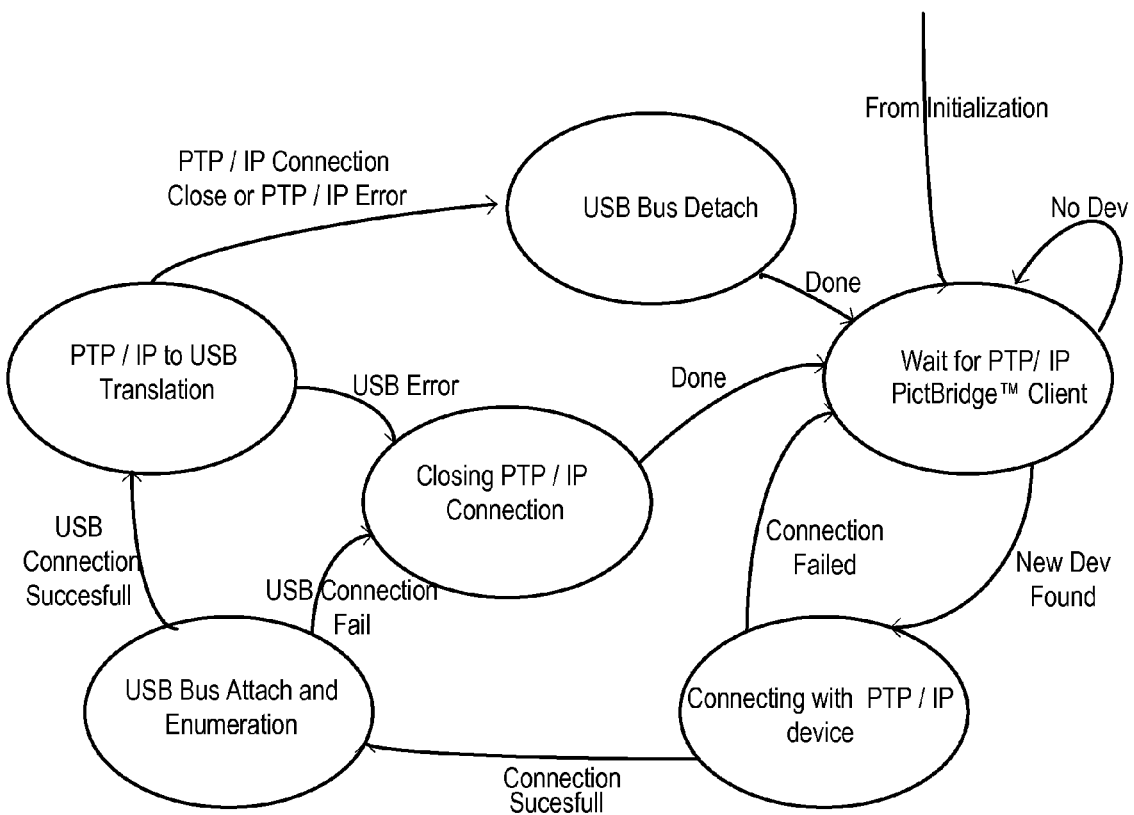
FIG. 8 is a PTP Printer Adapter Normal Function Sequence Diagram.

It will be seen that the PTP Printer Adapter transforms a bus based protocol (USB) into a networking protocol (IP). As shown in FIG. 8, this PTP protocol translation from one transport (PTP/USB) to another transport (PTP/IP) is performed only when a PTP/IP device is detected and a successful PTP/IP connection is established, e.g., as described in relation to FIGS. 3-6 and again performed by the device discovery layer 696. Then, if this is the first session to be established, the USB slave 689 of FIG. 7(b) attaches to the printer's USB bus 620, causing the enumeration and USB connection. The Initiator (printer) starts the communication with the remote PTP device, for example, a PTP/IP camera 650 as it would if the remote device were connected locally.

The USB attach and detach is performed by programmatically connecting/disconnecting a 1.5M pull up resistor (see USB BUS SPECIFICATIONS) used by USB standard for detection of a USB 12 Mbps device connected to the bus.

Since only one remote device 650 connected to the PTP printer adapter 701a prints to the actual printer at a time, the printer adapter deals with multiple paired PTP/IP devices in sequence beginning with the first paired device for which print intent has been detected. Once the printing is done with this device, the dongle looks for more paired PTP/IP devices (with print intent). If more devices are detected, the printer chooses one and initiates the connection to them.

Due to the PTP/USB transport specification limitations (i.e not knowing the next phase of a PTP command), the translation that takes place between PTP/USB and PTP/IP can't be done just at the transport level. The device will need to be a PTP Gateway, in the sense that it will interpret the PTP payload to figure out what command is in progress. In this way, the translator will be able to associate a command with a known data-phase (by maintaining a lookup table with the associations). This device is not generally designed to work with vendor specific commands, and so, for each vendor command to be supported, the translation table would be updated with vendor specific information.

PTP PC Adapter

Figure 7C:
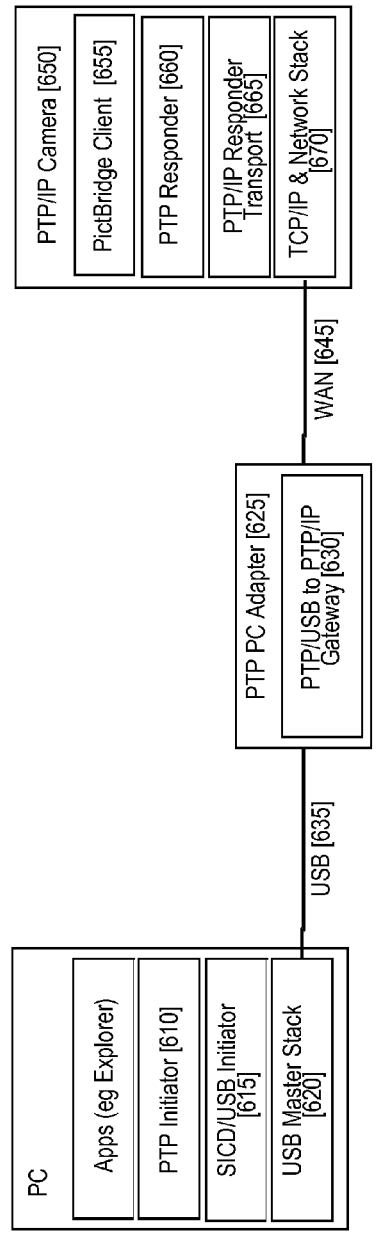

Referring to FIG. 7(c), PC adapter 625 works in a very similar manner as the PTP Printer Adapter of FIG. 7(b). A difference is that it can establish a connection with a PTP generic responder application instead of a PictBridge PTP responder. This device, due to USB limitations, will be either connected with only one PTP/IP Responder, for example, within a PTP/IP camera 650, either at any time or it would establish virtual sessions for each PTP/IP Responder.

Figure 9:
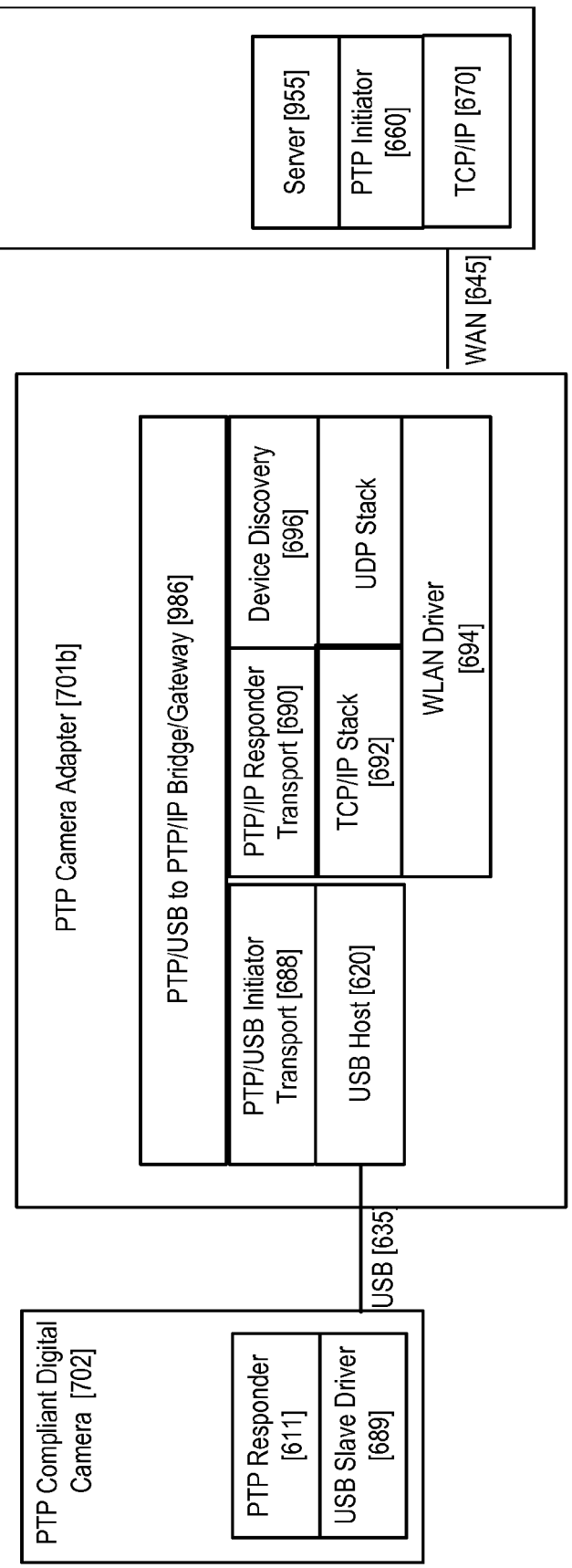
FIG. 9 illustrates a digital camera device that cooperates with a remote storage device via a camera adapter to initiate image transfer from the camera device to the storage device.

Referring now to FIG. 9, there is illustrated a variant example of the camera adapter of FIG. 7(a) which preferably runs under the control of a PTP/USB to PTP/IP application 986. This embodiment incorporates a PTP compliant digital camera 702 connected via a USB connection 635 to the PTP Camera Adapter 701b, as described above in relation to FIG. 7(a). In this case, however, the application 986 controls the camera PTP responder 690 to communicate across the wireless LAN 645 via the driver 694 to a server application 955 running in a remote storage device 900.

The server application 955 initiates contact with the camera 702 via the application 986 to determine whether the camera is free to perform backup storage.

In one such embodiment, the storage device sends a request via the PTP Camera Adapter 701b to the camera periodically to determine whether the camera is free to perform backup storage. If application 986 determines that the camera is free to perform backup, a message is sent to the storage device. The storage device then requests the data to be stored. This request is sent via the PTP Camera Adapter 701b to the camera. The camera then sends the requested data via the PTP Camera Adapter 701b to the storage device 900, where it is stored in backup memory (not shown).

In an alternative embodiment, the storage device sends a single request to the PTP Camera Adapter 701b. The PTP Camera Adapter then sends requests to the camera periodically to determine whether the camera is free to perform backup storage. If it is determined that the camera is free to perform backup, the PTP Camera Adapter 701b requests the data to be stored from the camera. Alternatively the PTP Camera Adapter 701b informs the storage device 900 that the camera is free to perform backup, and the storage device requests the PTP Camera Adapter 701b to retrieve the data to be stored. The camera then sends the requested data to the PTP Camera Adapter 701b where it is either stored in cache for later retrieval by the storage device 900, or it is sent directly to the storage device 900 where it is stored.

However, it will be appreciated in these embodiments, that the request to determine whether the camera is free to perform backup storage may also include a request for the data to be stored. In such case, once the camera is free to perform backup storage, the data is sent either to the PTP Camera Adapter 701b or via the PTP Camera Adapter 701b to the storage device 900, without the need for an independent data request.

Figure 10:
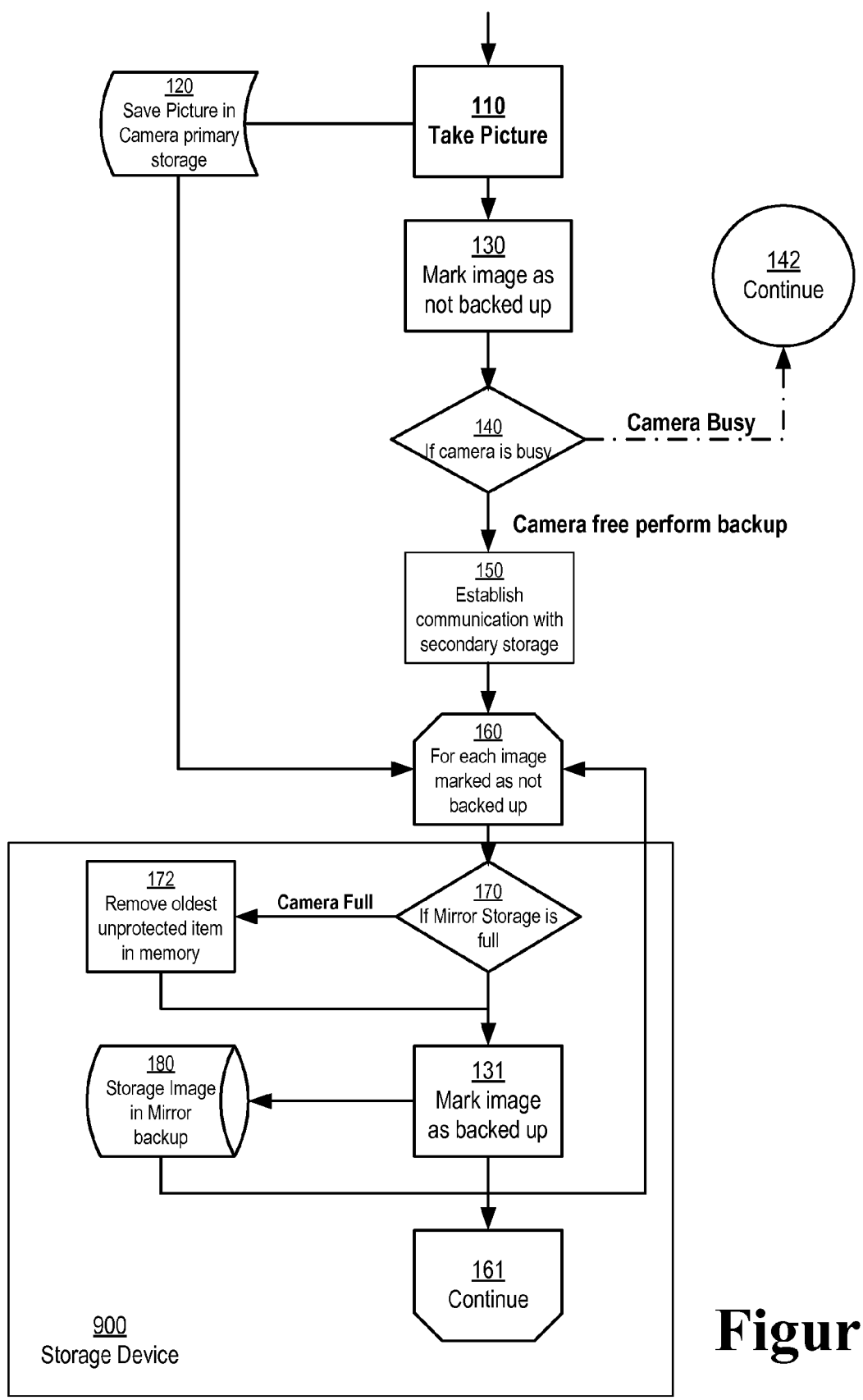
FIG. 10 is a flowchart depicting a process involving a digital camera device operating with the adapter and remote storage device of FIG. 9.

Referring now to FIG. 10, there is illustrated a flow chart depicting an exemplary operation of the camera 702 in communication with the storage device 900 via the PTP Camera Adapter 701b, preferably according to the embodiment of FIG. 9.

A picture is taken 110 with the camera, and the image is stored 120 in a primary storage facility of the camera 702. The image is then marked as not backed up, 130. The camera receives requests periodically from the storage device via the PTP Camera Adapter 701b or from the PTP Camera Adapter 701b. If the camera is busy, it will continue to take pictures 142. If the camera is free, it establishes communication 150 with either the storage device 900 via the PTP Camera Adapter 701b or the PTP Camera Adapter 701b.

The storage device or cache is queried as to the available memory 140. Preferably, the storage device or cache operates as FIFO in that if the memory is full, the oldest image in the memory stack is removed 172. An image stored 120 in a primary storage facility of the camera 702b marked as not backed up, is marked as backed up 131 and stored in the backup memory. The storage device or cache is again queried as to the available memory 140 and the next image marked as not backed up, is marked as backed up and stored in the memory. The procedure continues until all images have been backed up or the camera is no longer free to perform backup.

It will be appreciated that the storage device 900 or camera may allow a user to mark images not to be deleted from backup memory. In this case, some images will be protected and will not be removed. Thus if the memory is full of images that are marked not for deletion, the camera may be notified that the storage device is full.

It will also be appreciated that the camera application software can be arranged to communicate with the adapter application 986 to receive information about the storage device 900, such as the last image backed up, or the first image backed up on the device, and may then be viewed on a display of the camera.

Furthermore, it will be appreciated that the storage device 900 may keep track of the images and the changes thereto as stored in the primary storage of the camera. For example, if all the images on the primary storage have been deleted, the storage device may automatically prompt the user to ask if the corresponding backup memory images should be deleted as well.

In one embodiment, the protocol for selecting the storage device 900 with which the camera adapter 701b communicates during a backup session is as described in relation to FIGS. 2 to 6 and is implemented within a device discovery layer 696 which is responsive to a user actuating a pairing actuator (not shown) on the adapter 702b and the storage device 900 within the required time out period and without interference from other pairing devices.

However, it will be appreciated that the adapter and the storage device may be arranged to identify and communicate with each other by other means.

It will also be appreciated that the storage device can be implemented in many different formats. For example, it could be a simple battery powered device which a photographer keeps in his pocket. The device may have a simple interface to enable operation and indicate, e.g., memory used and/or battery power. The storage device may also take the form of a remote computer and backup store either dedicated to the user or common to many users or even operated by a bureau service. Alternatively, the storage device may be implemented in a modified printer associated with the camera as shown in FIG. 7(a).

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components.

The invention claimed is:

1. A method for establishing a paired connection across a network between first and second media devices including a digital camera adapter device, comprising:
    responsive to user interaction with the first media device, transmitting a first information message across the network including an identifier that includes a request to pair the first media device with the second media device;
    responsive to receipt of a second information message from the second device within a first predetermined time period, retrieving an identifier of the second device from the second information message and transmitting across the network a confirmation message including an identifier of the first device and an identifier of the second device;
    responsive to receipt of a corresponding confirmation message from the second device within a second predetermined time period, completing a paired connection with the second device; and
    initiating image transfer to a remote storage device from the digital camera adapter device that serves as temporary storage for a digital camera device.

2. A method according to claim 1, wherein one or more of the information and confirmation messages are transmitted via User Datagram Protocol.

3. A method according to claim 1, wherein said first and second time periods are substantially the same.

4. A method according to claim 1, wherein said first media device is responsive to receipt of an information message from a third media device, different from said second media device, upon failing to establish said paired connection with said second device during said first predetermined time period.

5. A method according to claim 1, wherein said first media device is responsive to receipt of a confirmation message from a third media device, different from said second device, upon failing to establish said paired connection with said second media device during said second predetermined time period.

6. A method according to claim 1, further comprising establishing one or more further paired connections with further media devices.

7. A method according to claim 1, wherein each of said information and confirmation messages includes a protocol identifier.

8. A method according to claim 1, further comprising communicating according to the Picture Transfer Protocol (PTP).

9. A method according to claim 1, wherein the digital camera adapter device comprises a PTP camera adapter.

10. A method according to claim 1, wherein the first and second devices further include a printer.

11. A method according to claim 1, wherein upon receipt of said first message and actuation of a switch, said second device automatically generating and transmitting said second message.

12. A method according to claim 1, wherein upon receipt of said second message and actuation of a switch, said first device automatically generating and transmitting said confirmation message.

13. A method according to claim 1, wherein said paired connection employs a communications protocol which permits the first device to control the second device in providing a media acquisition, filtering or output service, or combinations thereof.

14. A method according to claim 1, wherein said digital camera adapter device communicates with the digital camera device using a bus protocol.

15. A backup system comprising an adapter device, a storage device, and a processor-readable memory having code embedded therein for programming a processor to perform the method of claim 1, said adapter device being arranged to connect to a camera via a bus interface and arranged to connect to said storage device via a network interface, thereby enabling messages to be transmitted between said storage device and a camera.

16. A backup system according to claim 15 wherein said adapter device is arranged to communicate with each of said camera and said storage device using the PTP protocol.

17. A backup system according to claim 16 wherein said storage device is arranged initiate data transfer from said camera to said storage device via said adapter device.

18. A non-transitory processor-readable media having processor readable code embodied thereon, said processor readable code for programming a processor to perform a method for establishing a paired connection across a network between first and second media devices including a digital camera adapter device, wherein the method comprises:
    responsive to user interaction with the first media device, transmitting a first information message across the network including an identifier that includes a request to pair the first media device with the second media device;
    responsive to receipt of a second information message from the second device within a first predetermined time period, retrieving an identifier of the second device from the second information message and transmitting across the network a confirmation message including an identifier of the first device and an identifier of the second device; and
    responsive to receipt of a corresponding confirmation message from the second device within a second predetermined time period, completing a paired connection with the second device; and
    initiating image transfer to a remote storage device from the digital camera adapter device that serves as temporary storage for a digital camera device.

19. The non-transitory, processor-readable media of claim 18, wherein one or more of the information and confirmation messages are transmitted via User Datagram Protocol.

20. The non-transitory, processor-readable media of claim 18, wherein said first and second time periods are substantially the same.

21. The non-transitory, processor-readable media of claim 18, wherein said first media device is responsive to receipt of an information message from a third media device, different from said second media device, upon failing to establish said paired connection with said second device during said first predetermined time period.

22. The non-transitory, processor-readable media of claim 18, wherein said first media device is responsive to receipt of a confirmation message from a third media device, different from said second device, upon failing to establish said paired connection with said second media device during said second predetermined time period.

23. The non-transitory, processor-readable media of claim 18, the method further comprising establishing one or more further paired connections with further media devices.

24. The non-transitory, processor-readable media of claim 18, wherein each of said information and confirmation messages includes a protocol identifier.

25. The non-transitory, processor-readable media of claim 18, the method further comprising communicating according to the Picture Transfer Protocol (PTP).

26. The non-transitory, processor-readable media of claim 18, wherein the digital camera adapter device comprises a PTP camera adapter.

27. The non-transitory, processor-readable media of claim 26, wherein the first and second devices further comprise a printer.

28. The non-transitory, processor-readable media of claim 18, wherein upon receipt of said first message and actuation of a second pairing actuator associated with said second device, said second device automatically generating and transmitting said second message.

29. The non-transitory, processor-readable media of claim 18, wherein upon receipt of said second message and actuation of said pairing actuator, said first device automatically generating and transmitting said confirmation message.

30. The non-transitory, processor-readable media of claim 18, wherein said paired connection employs a communications protocol which permits the first device to control the second device in providing a media acquisition, filtering or output service, or combinations thereof.

31. The non-transitory, processor-readable media of claim 18, wherein said digital camera adapter device communicates with the digital camera device using a bus protocol.

32. A digital camera adapter device, comprising a processor and non-transitory processor-readable media as set forth at any of claims 18-31.

* * * * *